US011323307B2

(12) United States Patent
Mayya et al.

(10) Patent No.: US 11,323,307 B2
(45) Date of Patent: May 3, 2022

(54) METHOD AND SYSTEM OF A DYNAMIC HIGH-AVAILABILITY MODE BASED ON CURRENT WIDE AREA NETWORK CONNECTIVITY

(71) Applicant: Nicira, Inc., Palo Alto, CA (US)

(72) Inventors: Ajit Ramachandra Mayya, Saratoga, CA (US); Parag Pritam Thakore, Los Gatos, CA (US); Stephen Craig Connors, San Jose, CA (US); Steven Michael Woo, Los Altos, CA (US); Sunil Mukundan, Chennai (IN); Nitin Kumar Ananda, San Jose, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

(21) Appl. No.: 15/838,355

(22) Filed: Dec. 12, 2017

(65) Prior Publication Data

US 2019/0140890 A1 May 9, 2019

Related U.S. Application Data

(60) Provisional application No. 62/583,733, filed on Nov. 9, 2017.

(51) Int. Cl.
*H04L 12/24* (2006.01)
*H04L 41/0654* (2022.01)
(Continued)

(52) U.S. Cl.
CPC ...... *H04L 41/0654* (2013.01); *H04L 12/2856* (2013.01); *H04L 12/4633* (2013.01); *H04L 12/66* (2013.01); *H04L 41/12* (2013.01)

(58) Field of Classification Search
CPC ..... H04L 12/24; H04L 41/0654; H04L 41/12; H04L 41/0668; H04L 45/22;
(Continued)

(56) References Cited

U.S. PATENT DOCUMENTS 5,652,751 A  7/1997 Sharony
5,909,553 A  6/1999 Campbell et al.
(Continued)

FOREIGN PATENT DOCUMENTS

CN  1926809 A  3/2007
CN  102811165 A  12/2012
(Continued)

OTHER PUBLICATIONS

Non-Published Commonly owned International Patent Application PCT/US2018/059708, filed Nov. 7, 2018, 28 pages, Nicira, Inc.
(Continued)

*Primary Examiner* — Jeffrey M Rutkowski
*Assistant Examiner* — Sudesh M Patidar
(74) *Attorney, Agent, or Firm* — Adeli LLP

(57) ABSTRACT

In one aspect, a computer-networking method useful for implementing dynamic high-availability (HA) mode based on current wide area network (WAN) connectivity, comprising the steps of: providing a first edge device of a local area network (LAN) with the WAN; providing a second edge device of the LAN with the WAN; and synchronizing a state of plurality of links with the WAN that are connected to the first edge device and the second edge device.

14 Claims, 14 Drawing Sheets

(51) Int. Cl.
  *H04L 12/66* (2006.01)
  *H04L 12/28* (2006.01)
  *H04L 12/46* (2006.01)
  *H04L 41/12* (2022.01)

(58) Field of Classification Search
  CPC .............. H04L 47/125; H04L 67/1002; H04L 12/2856; H04L 12/46; H04L 12/4633; H04L 12/66; H04W 28/08; H04W 28/09; H04W 28/0933; H04W 28/0942; H04W 56/001
  USPC ........................................................ 370/225
  See application file for complete search history.

(56) References Cited

U.S. PATENT DOCUMENTS

| | | | |
|---|---|---|---|
| 6,154,465 A | 11/2000 | Pickett | |
| 6,157,648 A | 12/2000 | Voit et al. | |
| 6,201,810 B1 | 3/2001 | Masuda et al. | |
| 6,363,378 B1 | 3/2002 | Conklin et al. | |
| 6,445,682 B1 | 9/2002 | Weitz | |
| 6,744,775 B1 | 6/2004 | Beshai et al. | |
| 6,976,087 B1 | 12/2005 | Westfall et al. | |
| 7,003,481 B2 | 2/2006 | Banka et al. | |
| 7,280,476 B2 | 10/2007 | Anderson | |
| 7,313,629 B1 | 12/2007 | Nucci et al. | |
| 7,320,017 B1 | 1/2008 | Kurapati et al. | |
| 7,373,660 B1 | 5/2008 | Guichard et al. | |
| 7,581,022 B1 | 8/2009 | Griffin et al. | |
| 7,680,925 B2 | 3/2010 | Sathyanarayana et al. | |
| 7,681,236 B2 | 3/2010 | Tamura et al. | |
| 7,962,458 B2 | 6/2011 | Holenstein et al. | |
| 8,094,575 B1 | 1/2012 | Vadlakonda et al. | |
| 8,094,659 B1 | 1/2012 | Arad | |
| 8,111,692 B2 * | 2/2012 | Ray | H04L 45/00 370/351 |
| 8,141,156 B1 | 3/2012 | Mao et al. | |
| 8,224,971 B1 | 7/2012 | Miller et al. | |
| 8,228,928 B2 | 7/2012 | Parandekar et al. | |
| 8,243,589 B1 * | 8/2012 | Trost | H04L 67/1034 370/220 |
| 8,259,566 B2 | 9/2012 | Chen et al. | |
| 8,274,891 B2 | 9/2012 | Averi et al. | |
| 8,301,749 B1 | 10/2012 | Finklestein et al. | |
| 8,385,227 B1 | 2/2013 | Downey | |
| 8,566,452 B1 | 10/2013 | Goodwin et al. | |
| 8,630,291 B2 | 1/2014 | Shaffer et al. | |
| 8,661,295 B1 | 2/2014 | Khanna et al. | |
| 8,724,456 B1 * | 5/2014 | Hong | G06F 11/3055 370/225 |
| 8,724,503 B2 | 5/2014 | Johnsson et al. | |
| 8,745,177 B1 | 6/2014 | Kazerani et al. | |
| 8,799,504 B2 | 8/2014 | Capone et al. | |
| 8,804,745 B1 | 8/2014 | Sinn | |
| 8,806,482 B1 | 8/2014 | Nagargadde et al. | |
| 8,856,339 B2 | 10/2014 | Mestery et al. | |
| 8,964,548 B1 | 2/2015 | Keralapura et al. | |
| 8,989,199 B1 | 3/2015 | Sella et al. | |
| 9,009,217 B1 | 4/2015 | Nagargadde et al. | |
| 9,055,000 B1 | 6/2015 | Ghosh et al. | |
| 9,060,025 B2 | 6/2015 | Xu | |
| 9,071,607 B2 | 6/2015 | Twitchell, Jr. | |
| 9,075,771 B1 | 7/2015 | Gawali et al. | |
| 9,135,037 B1 | 9/2015 | Petrescu-Prahova et al. | |
| 9,137,334 B2 | 9/2015 | Zhou | |
| 9,154,327 B1 | 10/2015 | Marino et al. | |
| 9,203,764 B2 | 12/2015 | Shirazipour et al. | |
| 9,306,949 B1 | 4/2016 | Richard et al. | |
| 9,323,561 B2 | 4/2016 | Ayala et al. | |
| 9,336,040 B2 | 5/2016 | Dong et al. | |
| 9,354,983 B1 | 5/2016 | Yenamandra et al. | |
| 9,356,943 B1 | 5/2016 | Lopilato et al. | |
| 9,379,981 B1 | 6/2016 | Zhou et al. | |
| 9,413,724 B2 | 8/2016 | Xu | |
| 9,419,878 B2 | 8/2016 | Hsiao et al. | |
| 9,432,245 B1 | 8/2016 | Sorenson et al. | |
| 9,438,566 B2 | 9/2016 | Zhang et al. | |
| 9,450,817 B1 | 9/2016 | Bahadur et al. | |
| 9,450,852 B1 | 9/2016 | Chen et al. | |
| 9,462,010 B1 | 10/2016 | Stevenson | |
| 9,467,478 B1 | 10/2016 | Khan et al. | |
| 9,485,163 B1 | 11/2016 | Fries et al. | |
| 9,521,067 B2 | 12/2016 | Michael et al. | |
| 9,525,564 B2 | 12/2016 | Lee | |
| 9,559,951 B1 | 1/2017 | Sajassi et al. | |
| 9,563,423 B1 | 2/2017 | Pittman | |
| 9,602,389 B1 | 3/2017 | Maveli et al. | |
| 9,608,917 B1 | 3/2017 | Anderson et al. | |
| 9,608,962 B1 | 3/2017 | Chang | |
| 9,621,460 B2 | 4/2017 | Mehta et al. | |
| 9,641,551 B1 | 5/2017 | Kariyanahalli | |
| 9,665,432 B2 | 5/2017 | Kruse et al. | |
| 9,686,127 B2 | 6/2017 | Ramachandran et al. | |
| 9,715,401 B2 | 7/2017 | Devine et al. | |
| 9,717,021 B2 | 7/2017 | Hughes et al. | |
| 9,722,815 B2 | 8/2017 | Mukundan et al. | |
| 9,747,249 B2 | 8/2017 | Cherian et al. | |
| 9,755,965 B1 | 9/2017 | Yadav et al. | |
| 9,787,559 B1 | 10/2017 | Schroeder | |
| 9,807,004 B2 | 10/2017 | Koley et al. | |
| 9,819,565 B2 | 11/2017 | Djukic et al. | |
| 9,825,822 B1 | 11/2017 | Holland | |
| 9,825,911 B1 | 11/2017 | Brandwine | |
| 9,825,992 B2 | 11/2017 | Xu | |
| 9,832,128 B1 | 11/2017 | Ashner et al. | |
| 9,832,205 B2 | 11/2017 | Santhi et al. | |
| 9,875,355 B1 | 1/2018 | Williams | |
| 9,906,401 B1 | 2/2018 | Rao | |
| 9,930,011 B1 | 3/2018 | Clemons, Jr. et al. | |
| 9,935,829 B1 | 4/2018 | Miller et al. | |
| 9,942,787 B1 | 4/2018 | Tillotson | |
| 10,038,601 B1 | 7/2018 | Becker et al. | |
| 10,057,183 B2 | 8/2018 | Salle et al. | |
| 10,057,294 B2 | 8/2018 | Xu | |
| 10,135,789 B2 | 11/2018 | Mayya et al. | |
| 10,142,226 B1 | 11/2018 | Wu et al. | |
| 10,178,032 B1 | 1/2019 | Freitas | |
| 10,187,289 B1 | 1/2019 | Chen et al. | |
| 10,229,017 B1 | 3/2019 | Zou et al. | |
| 10,237,123 B2 | 3/2019 | Dubey et al. | |
| 10,250,498 B1 | 4/2019 | Bales et al. | |
| 10,263,832 B1 | 4/2019 | Ghosh | |
| 10,320,664 B2 | 6/2019 | Nainar et al. | |
| 10,320,691 B1 | 6/2019 | Matthews et al. | |
| 10,326,830 B1 | 6/2019 | Singh | |
| 10,348,767 B1 | 7/2019 | Lee et al. | |
| 10,355,989 B1 | 7/2019 | Panchai et al. | |
| 10,425,382 B2 | 9/2019 | Mayya et al. | |
| 10,454,708 B2 | 10/2019 | Mibu | |
| 10,454,714 B2 | 10/2019 | Mayya et al. | |
| 10,461,993 B2 | 10/2019 | Turabi et al. | |
| 10,498,652 B2 | 12/2019 | Mayya et al. | |
| 10,511,546 B2 | 12/2019 | Singarayan et al. | |
| 10,523,539 B2 | 12/2019 | Mayya et al. | |
| 10,550,093 B2 | 2/2020 | Ojima et al. | |
| 10,554,538 B2 | 2/2020 | Spohn et al. | |
| 10,560,431 B1 | 2/2020 | Chen et al. | |
| 10,565,464 B2 | 2/2020 | Han et al. | |
| 10,567,519 B1 | 2/2020 | Mukhopadhyaya et al. | |
| 10,574,528 B2 | 2/2020 | Mayya et al. | |
| 10,594,516 B2 | 3/2020 | Cidon et al. | |
| 10,594,659 B2 | 3/2020 | El-Moussa et al. | |
| 10,608,844 B2 | 3/2020 | Cidon et al. | |
| 10,637,889 B2 | 4/2020 | Ermagan et al. | |
| 10,666,460 B2 | 5/2020 | Cidon et al. | |
| 10,686,625 B2 | 6/2020 | Cidon et al. | |
| 10,749,711 B2 | 8/2020 | Mukundan et al. | |
| 10,778,466 B2 | 9/2020 | Cidon et al. | |
| 10,778,528 B2 | 9/2020 | Mayya et al. | |
| 10,805,114 B2 | 10/2020 | Cidon et al. | |
| 10,805,272 B2 | 10/2020 | Mayya et al. | |
| 10,819,564 B2 | 10/2020 | Turabi et al. | |
| 10,826,775 B1 | 11/2020 | Moreno et al. | |

(56) References Cited

U.S. PATENT DOCUMENTS

| | | |
|---|---|---|
| 10,841,131 B2 | 11/2020 | Cidon et al. |
| 10,911,374 B1 | 2/2021 | Kumar et al. |
| 10,938,693 B2 | 3/2021 | Mayya et al. |
| 10,951,529 B2 | 3/2021 | Duan et al. |
| 10,958,479 B2 | 3/2021 | Cidon et al. |
| 10,959,098 B2 | 3/2021 | Cidon et al. |
| 10,992,558 B1 | 4/2021 | Silva et al. |
| 10,992,568 B2 | 4/2021 | Michael et al. |
| 10,999,100 B2 | 5/2021 | Cidon et al. |
| 10,999,137 B2 | 5/2021 | Cidon et al. |
| 10,999,165 B2 | 5/2021 | Cidon et al. |
| 11,005,684 B2 | 5/2021 | Cidon |
| 11,018,995 B2 | 5/2021 | Cidon et al. |
| 11,050,644 B2 | 6/2021 | Hegde et al. |
| 11,071,005 B2 | 7/2021 | Shen et al. |
| 11,108,851 B1 | 8/2021 | Kurmala et al. |
| 11,115,347 B2 | 9/2021 | Gupta et al. |
| 11,115,426 B1 | 9/2021 | Pazhyannur et al. |
| 11,128,492 B2 | 9/2021 | Sethi et al. |
| 2002/0085488 A1 | 7/2002 | Kobayashi |
| 2002/0087716 A1 | 7/2002 | Mustafa |
| 2002/0198840 A1 | 12/2002 | Banka et al. |
| 2003/0061269 A1 | 3/2003 | Hathaway et al. |
| 2003/0088697 A1 | 5/2003 | Matsuhira |
| 2003/0112766 A1 | 6/2003 | Riedel et al. |
| 2003/0112808 A1 | 6/2003 | Solomon |
| 2003/0126468 A1 | 7/2003 | Markham |
| 2003/0161313 A1 | 8/2003 | Jinmei et al. |
| 2003/0189919 A1 | 10/2003 | Gupta et al. |
| 2003/0202506 A1 | 10/2003 | Perkins et al. |
| 2003/0219030 A1 | 11/2003 | Gubbi |
| 2004/0059831 A1 | 3/2004 | Chu et al. |
| 2004/0068668 A1 | 4/2004 | Lor et al. |
| 2004/0165601 A1 | 8/2004 | Liu et al. |
| 2004/0224771 A1 | 11/2004 | Chen et al. |
| 2005/0078690 A1 | 4/2005 | DeLangis |
| 2005/0154790 A1 | 7/2005 | Nagata et al. |
| 2005/0172161 A1 | 8/2005 | Cruz et al. |
| 2005/0195754 A1 | 9/2005 | Nosella |
| 2005/0265255 A1 | 12/2005 | Kodialam et al. |
| 2006/0002291 A1 | 1/2006 | Alicherry et al. |
| 2006/0114838 A1 | 6/2006 | Mandavilli et al. |
| 2006/0171365 A1 | 8/2006 | Borella |
| 2006/0182034 A1 | 8/2006 | Klinker et al. |
| 2006/0182035 A1* | 8/2006 | Vasseur .................. H04L 45/24 370/238 |
| 2006/0193247 A1 | 8/2006 | Naseh et al. |
| 2006/0193252 A1 | 8/2006 | Naseh et al. |
| 2007/0064604 A1 | 3/2007 | Chen et al. |
| 2007/0064702 A1 | 3/2007 | Bates et al. |
| 2007/0083727 A1 | 4/2007 | Johnston et al. |
| 2007/0091794 A1* | 4/2007 | Filsfils .................. H04L 12/66 370/228 |
| 2007/0103548 A1 | 5/2007 | Carter |
| 2007/0115812 A1 | 5/2007 | Hughes |
| 2007/0121486 A1 | 5/2007 | Guichard et al. |
| 2007/0130325 A1 | 6/2007 | Lesser |
| 2007/0162639 A1 | 7/2007 | Chu et al. |
| 2007/0177511 A1 | 8/2007 | Das et al. |
| 2007/0237081 A1 | 10/2007 | Kodialam et al. |
| 2007/0260746 A1 | 11/2007 | Mirtorabi et al. |
| 2007/0268882 A1 | 11/2007 | Breslau et al. |
| 2008/0002670 A1 | 1/2008 | Bugenhagen et al. |
| 2008/0049621 A1 | 2/2008 | McGuire et al. |
| 2008/0080509 A1 | 4/2008 | Khanna et al. |
| 2008/0095187 A1 | 4/2008 | Jung et al. |
| 2008/0117930 A1 | 5/2008 | Chakareski et al. |
| 2008/0144532 A1 | 6/2008 | Chamarajanagar et al. |
| 2008/0181116 A1 | 7/2008 | Kavanaugh et al. |
| 2008/0219276 A1 | 9/2008 | Shah |
| 2008/0240121 A1 | 10/2008 | Xiong et al. |
| 2009/0013210 A1 | 1/2009 | McIntosh et al. |
| 2009/0125617 A1 | 5/2009 | Kiessig et al. |
| 2009/0141642 A1 | 6/2009 | Sun |
| 2009/0154463 A1 | 6/2009 | Hines et al. |
| 2009/0247204 A1 | 10/2009 | Sennett et al. |
| 2009/0274045 A1 | 11/2009 | Meier et al. |
| 2009/0276657 A1 | 11/2009 | Wetmore et al. |
| 2009/0303880 A1 | 12/2009 | Maltz et al. |
| 2010/0008361 A1 | 1/2010 | Guichard et al. |
| 2010/0017802 A1 | 1/2010 | Lojewski |
| 2010/0046532 A1 | 2/2010 | Okita |
| 2010/0061379 A1 | 3/2010 | Parandekar et al. |
| 2010/0080129 A1 | 4/2010 | Strahan et al. |
| 2010/0088440 A1 | 4/2010 | Banks et al. |
| 2010/0091823 A1 | 4/2010 | Retana et al. |
| 2010/0107162 A1 | 4/2010 | Edwards et al. |
| 2010/0118727 A1 | 5/2010 | Draves et al. |
| 2010/0118886 A1 | 5/2010 | Saavedra |
| 2010/0165985 A1 | 7/2010 | Sharma et al. |
| 2010/0191884 A1 | 7/2010 | Holenstein et al. |
| 2010/0223621 A1 | 9/2010 | Joshi et al. |
| 2010/0226246 A1* | 9/2010 | Proulx .................... H04L 47/70 370/228 |
| 2010/0309841 A1 | 12/2010 | Conte |
| 2010/0309912 A1 | 12/2010 | Mehta et al. |
| 2010/0322255 A1 | 12/2010 | Hao et al. |
| 2010/0332657 A1 | 12/2010 | Elyashev et al. |
| 2011/0007752 A1 | 1/2011 | Silva et al. |
| 2011/0032939 A1 | 2/2011 | Nozaki et al. |
| 2011/0040814 A1 | 2/2011 | Higgins |
| 2011/0075674 A1 | 3/2011 | Li et al. |
| 2011/0107139 A1 | 5/2011 | Middlecamp et al. |
| 2011/0110370 A1 | 5/2011 | Moreno et al. |
| 2011/0141877 A1 | 6/2011 | Xu et al. |
| 2011/0142041 A1 | 6/2011 | Imai |
| 2011/0153909 A1 | 6/2011 | Dong |
| 2011/0255397 A1 | 10/2011 | Kadakia et al. |
| 2012/0008630 A1 | 1/2012 | Ould-Brahim |
| 2012/0027013 A1 | 2/2012 | Napierala |
| 2012/0136697 A1 | 5/2012 | Peles et al. |
| 2012/0157068 A1 | 6/2012 | Eichen et al. |
| 2012/0173694 A1 | 7/2012 | Yan et al. |
| 2012/0173919 A1 | 7/2012 | Patel et al. |
| 2012/0182940 A1 | 7/2012 | Taleb et al. |
| 2012/0221955 A1* | 8/2012 | Raleigh .................. H04M 15/00 715/736 |
| 2012/0227093 A1 | 9/2012 | Shalzkamer et al. |
| 2012/0250682 A1 | 10/2012 | Vincent et al. |
| 2012/0250686 A1 | 10/2012 | Vincent et al. |
| 2012/0281706 A1 | 11/2012 | Agarwal et al. |
| 2012/0287818 A1 | 11/2012 | Corti et al. |
| 2012/0300615 A1 | 11/2012 | Kempf et al. |
| 2012/0307659 A1 | 12/2012 | Yamada |
| 2012/0317291 A1 | 12/2012 | Wolfe |
| 2013/0019005 A1* | 1/2013 | Hui ........................ H04L 41/0896 709/224 |
| 2013/0021968 A1 | 1/2013 | Reznik et al. |
| 2013/0044764 A1 | 2/2013 | Casado et al. |
| 2013/0051237 A1 | 2/2013 | Ong |
| 2013/0051399 A1 | 2/2013 | Zhang et al. |
| 2013/0054763 A1 | 2/2013 | Merwe et al. |
| 2013/0086267 A1 | 4/2013 | Gelenbe et al. |
| 2013/0103834 A1 | 4/2013 | Dzerve et al. |
| 2013/0124718 A1 | 5/2013 | Griffith et al. |
| 2013/0124911 A1 | 5/2013 | Griffith et al. |
| 2013/0124912 A1 | 5/2013 | Griffith et al. |
| 2013/0128889 A1 | 5/2013 | Mathur et al. |
| 2013/0142201 A1 | 6/2013 | Kim et al. |
| 2013/0170354 A1 | 7/2013 | Takashima et al. |
| 2013/0173788 A1 | 7/2013 | Song |
| 2013/0182712 A1 | 7/2013 | Aguayo et al. |
| 2013/0191688 A1 | 7/2013 | Agarwal et al. |
| 2013/0238782 A1 | 9/2013 | Zhao et al. |
| 2013/0242718 A1* | 9/2013 | Zhang .................. H04L 12/4633 370/218 |
| 2013/0254599 A1 | 9/2013 | Katkar et al. |
| 2013/0258839 A1 | 10/2013 | Wang et al. |
| 2013/0266015 A1 | 10/2013 | Qu et al. |
| 2013/0266019 A1 | 10/2013 | Qu et al. |
| 2013/0283364 A1 | 10/2013 | Chang et al. |
| 2013/0286846 A1 | 10/2013 | Atlas et al. |
| 2013/0297611 A1 | 11/2013 | Moritz et al. |
| 2013/0297770 A1 | 11/2013 | Zhang |

(56) References Cited

U.S. PATENT DOCUMENTS

| | | |
|---|---|---|
| 2013/0301469 A1 | 11/2013 | Suga |
| 2013/0301642 A1 | 11/2013 | Radhakrishnan et al. |
| 2013/0308444 A1 | 11/2013 | Sem-Jacobsen et al. |
| 2013/0315242 A1 | 11/2013 | Wang et al. |
| 2013/0315243 A1 | 11/2013 | Huang et al. |
| 2013/0329548 A1 | 12/2013 | Nakil et al. |
| 2013/0329601 A1 | 12/2013 | Yin et al. |
| 2013/0329734 A1 | 12/2013 | Chesla et al. |
| 2013/0346470 A1 | 12/2013 | Obstfeld et al. |
| 2014/0019604 A1 | 1/2014 | Twitchell, Jr. |
| 2014/0019750 A1 | 1/2014 | Dodgson et al. |
| 2014/0040975 A1 | 2/2014 | Raleigh et al. |
| 2014/0064283 A1 | 3/2014 | Balus et al. |
| 2014/0092907 A1 | 4/2014 | Sridhar et al. |
| 2014/0108665 A1 | 4/2014 | Arora et al. |
| 2014/0112171 A1 | 4/2014 | Pasdar |
| 2014/0115584 A1 | 4/2014 | Mudigonda et al. |
| 2014/0123135 A1 | 5/2014 | Huang et al. |
| 2014/0126418 A1 | 5/2014 | Brendel et al. |
| 2014/0156818 A1 | 6/2014 | Hunt |
| 2014/0156823 A1 | 6/2014 | Liu et al. |
| 2014/0164560 A1 | 6/2014 | Ko et al. |
| 2014/0164617 A1 | 6/2014 | Jalan et al. |
| 2014/0173113 A1 | 6/2014 | Vemuri et al. |
| 2014/0173331 A1 | 6/2014 | Martin et al. |
| 2014/0181824 A1 | 6/2014 | Saund et al. |
| 2014/0208317 A1 | 7/2014 | Nakagawa |
| 2014/0219135 A1 | 8/2014 | Li et al. |
| 2014/0223507 A1 | 8/2014 | Xu |
| 2014/0229210 A1 | 8/2014 | Sharifian et al. |
| 2014/0244851 A1 | 8/2014 | Lee |
| 2014/0258535 A1 | 9/2014 | Zhang |
| 2014/0269690 A1 | 9/2014 | Tu |
| 2014/0279862 A1 | 9/2014 | Dietz et al. |
| 2014/0280499 A1 | 9/2014 | Basavaiah et al. |
| 2014/0317440 A1 | 10/2014 | Biermayr et al. |
| 2014/0321277 A1 | 10/2014 | Lynn, Jr. et al. |
| 2014/0337500 A1 | 11/2014 | Lee |
| 2014/0341109 A1 | 11/2014 | Cartmell et al. |
| 2014/0372582 A1 | 12/2014 | Ghanwani et al. |
| 2015/0003240 A1 | 1/2015 | Drwiega et al. |
| 2015/0016249 A1 | 1/2015 | Mukundan et al. |
| 2015/0029864 A1 | 1/2015 | Raileanu et al. |
| 2015/0039744 A1 | 2/2015 | Niazi et al. |
| 2015/0046572 A1* | 2/2015 | Cheng .................... G06F 9/455 709/220 |
| 2015/0052247 A1 | 2/2015 | Threefoot et al. |
| 2015/0052517 A1 | 2/2015 | Raghu et al. |
| 2015/0056960 A1 | 2/2015 | Egner et al. |
| 2015/0058917 A1 | 2/2015 | Xu |
| 2015/0088942 A1 | 3/2015 | Shah |
| 2015/0089628 A1 | 3/2015 | Lang |
| 2015/0092603 A1 | 4/2015 | Aguayo et al. |
| 2015/0096011 A1 | 4/2015 | Watt |
| 2015/0124603 A1 | 5/2015 | Ketheesan et al. |
| 2015/0134777 A1 | 5/2015 | Onoue |
| 2015/0139238 A1 | 5/2015 | Pourzandi et al. |
| 2015/0146539 A1 | 5/2015 | Mehta et al. |
| 2015/0163152 A1 | 6/2015 | Li |
| 2015/0169340 A1 | 6/2015 | Haddad et al. |
| 2015/0172121 A1 | 6/2015 | Farkas et al. |
| 2015/0172169 A1 | 6/2015 | DeCusatis et al. |
| 2015/0188823 A1 | 7/2015 | Williams et al. |
| 2015/0189009 A1 | 7/2015 | Bemmel |
| 2015/0195178 A1 | 7/2015 | Bhattacharya et al. |
| 2015/0201036 A1 | 7/2015 | Nishiki et al. |
| 2015/0222543 A1 | 8/2015 | Song |
| 2015/0222638 A1 | 8/2015 | Morley |
| 2015/0236945 A1 | 8/2015 | Michael et al. |
| 2015/0236962 A1 | 8/2015 | Veres et al. |
| 2015/0244617 A1 | 8/2015 | Nakil et al. |
| 2015/0249644 A1 | 9/2015 | Xu |
| 2015/0257081 A1 | 9/2015 | Ramanujan et al. |
| 2015/0271056 A1 | 9/2015 | Chunduri et al. |
| 2015/0271104 A1 | 9/2015 | Chikkamath et al. |
| 2015/0271303 A1 | 9/2015 | Neginhal et al. |
| 2015/0312142 A1 | 10/2015 | Barabash et al. |
| 2015/0312760 A1 | 10/2015 | O'Toole |
| 2015/0317169 A1 | 11/2015 | Sinha et al. |
| 2015/0334025 A1 | 11/2015 | Rader |
| 2015/0334696 A1 | 11/2015 | Gu et al. |
| 2015/0341271 A1 | 11/2015 | Gomez |
| 2015/0349978 A1 | 12/2015 | Wu et al. |
| 2015/0350907 A1 | 12/2015 | Timariu et al. |
| 2015/0358236 A1 | 12/2015 | Roach et al. |
| 2015/0363221 A1 | 12/2015 | Terayama et al. |
| 2015/0363733 A1 | 12/2015 | Brown |
| 2015/0372943 A1 | 12/2015 | Hasan et al. |
| 2015/0372982 A1 | 12/2015 | Herle et al. |
| 2015/0381407 A1 | 12/2015 | Wang et al. |
| 2015/0381493 A1 | 12/2015 | Bansal et al. |
| 2016/0035183 A1 | 2/2016 | Buchholz et al. |
| 2016/0036924 A1 | 2/2016 | Koppolu et al. |
| 2016/0036938 A1 | 2/2016 | Aviles et al. |
| 2016/0037434 A1 | 2/2016 | Gopal et al. |
| 2016/0072669 A1 | 3/2016 | Saavedra |
| 2016/0080502 A1 | 3/2016 | Yadav et al. |
| 2016/0105353 A1 | 4/2016 | Cociglio |
| 2016/0105392 A1 | 4/2016 | Thakkar et al. |
| 2016/0105471 A1 | 4/2016 | Nunes et al. |
| 2016/0105488 A1 | 4/2016 | Thakkar et al. |
| 2016/0117185 A1 | 4/2016 | Fang et al. |
| 2016/0134461 A1 | 5/2016 | Sampath et al. |
| 2016/0134528 A1 | 5/2016 | Lin et al. |
| 2016/0134591 A1 | 5/2016 | Liao et al. |
| 2016/0142373 A1 | 5/2016 | Ossipov |
| 2016/0150055 A1 | 5/2016 | Choi |
| 2016/0164832 A1 | 6/2016 | Bellagamba et al. |
| 2016/0164914 A1 | 6/2016 | Madhav et al. |
| 2016/0173338 A1 | 6/2016 | Wolting |
| 2016/0191363 A1 | 6/2016 | Haraszti et al. |
| 2016/0191374 A1 | 6/2016 | Singh et al. |
| 2016/0192403 A1 | 6/2016 | Gupta et al. |
| 2016/0197834 A1 | 7/2016 | Luft |
| 2016/0197835 A1 | 7/2016 | Luft |
| 2016/0198003 A1 | 7/2016 | Luft |
| 2016/0210209 A1* | 7/2016 | Verkaik ............... G06F 11/2033 |
| 2016/0212773 A1 | 7/2016 | Kanderholm et al. |
| 2016/0218947 A1* | 7/2016 | Hughes .................... H04J 11/00 |
| 2016/0218951 A1 | 7/2016 | Vasseur et al. |
| 2016/0255169 A1 | 9/2016 | Kovvuri et al. |
| 2016/0261493 A1 | 9/2016 | Li |
| 2016/0261495 A1 | 9/2016 | Xia et al. |
| 2016/0261506 A1 | 9/2016 | Hegde et al. |
| 2016/0261639 A1 | 9/2016 | Xu |
| 2016/0269298 A1 | 9/2016 | Li et al. |
| 2016/0269926 A1 | 9/2016 | Sundaram |
| 2016/0285736 A1 | 9/2016 | Gu |
| 2016/0308762 A1 | 10/2016 | Teng et al. |
| 2016/0315912 A1 | 10/2016 | Mayya et al. |
| 2016/0323377 A1 | 11/2016 | Einkauf et al. |
| 2016/0328159 A1 | 11/2016 | Coddington et al. |
| 2016/0352588 A1 | 12/2016 | Subbarayan et al. |
| 2016/0353268 A1 | 12/2016 | Senarath et al. |
| 2016/0359738 A1 | 12/2016 | Sullenberger et al. |
| 2016/0366187 A1 | 12/2016 | Kamble |
| 2016/0371153 A1 | 12/2016 | Dornemann |
| 2016/0380886 A1 | 12/2016 | Blair et al. |
| 2016/0380906 A1 | 12/2016 | Hodique et al. |
| 2017/0005986 A1 | 1/2017 | Bansal et al. |
| 2017/0012870 A1 | 1/2017 | Blair et al. |
| 2017/0019428 A1 | 1/2017 | Cohn |
| 2017/0026283 A1 | 1/2017 | Williams et al. |
| 2017/0026355 A1 | 1/2017 | Mathaiyan et al. |
| 2017/0034046 A1 | 2/2017 | Cai et al. |
| 2017/0034129 A1 | 2/2017 | Sawant et al. |
| 2017/0048296 A1 | 2/2017 | Ramalho et al. |
| 2017/0053258 A1 | 2/2017 | Carney et al. |
| 2017/0055131 A1 | 2/2017 | Kong et al. |
| 2017/0063674 A1 | 3/2017 | Maskalik et al. |
| 2017/0063782 A1 | 3/2017 | Jain et al. |
| 2017/0063794 A1 | 3/2017 | Jain et al. |
| 2017/0064005 A1 | 3/2017 | Lee |
| 2017/0093625 A1 | 3/2017 | Pera et al. |

(56) References Cited

U.S. PATENT DOCUMENTS

| | | |
|---|---|---|
| 2017/0097841 A1 | 4/2017 | Chang et al. |
| 2017/0104653 A1 | 4/2017 | Badea et al. |
| 2017/0104755 A1 | 4/2017 | Arregoces et al. |
| 2017/0109212 A1 | 4/2017 | Gaurav et al. |
| 2017/0118173 A1 | 4/2017 | Arramreddy et al. |
| 2017/0123939 A1* | 5/2017 | Maheshwari ....... G06F 11/2069 |
| 2017/0126516 A1 | 5/2017 | Tiagi et al. |
| 2017/0126564 A1 | 5/2017 | Mayya et al. |
| 2017/0134186 A1 | 5/2017 | Mukundan et al. |
| 2017/0134520 A1 | 5/2017 | Abbasi et al. |
| 2017/0139789 A1 | 5/2017 | Fries et al. |
| 2017/0155557 A1 | 6/2017 | Desai et al. |
| 2017/0163473 A1 | 6/2017 | Sadana et al. |
| 2017/0171310 A1 | 6/2017 | Gardner |
| 2017/0181210 A1 | 6/2017 | Nadella et al. |
| 2017/0195161 A1 | 7/2017 | Ruel et al. |
| 2017/0195169 A1 | 7/2017 | Mills et al. |
| 2017/0201585 A1 | 7/2017 | Doraiswamy et al. |
| 2017/0207976 A1 | 7/2017 | Rovner et al. |
| 2017/0214545 A1 | 7/2017 | Cheng et al. |
| 2017/0214701 A1 | 7/2017 | Hasan |
| 2017/0223117 A1 | 8/2017 | Messerli et al. |
| 2017/0237710 A1 | 8/2017 | Mayya et al. |
| 2017/0257260 A1 | 9/2017 | Govindan et al. |
| 2017/0257309 A1 | 9/2017 | Appanna |
| 2017/0264496 A1 | 9/2017 | Ao et al. |
| 2017/0279717 A1 | 9/2017 | Bethers et al. |
| 2017/0279803 A1 | 9/2017 | Desai et al. |
| 2017/0280474 A1 | 9/2017 | Vesterinen et al. |
| 2017/0289002 A1 | 10/2017 | Ganguli et al. |
| 2017/0295264 A1 | 10/2017 | Touitou et al. |
| 2017/0302565 A1 | 10/2017 | Ghobadi et al. |
| 2017/0310641 A1 | 10/2017 | Jiang et al. |
| 2017/0310691 A1 | 10/2017 | Masseur et al. |
| 2017/0317974 A1 | 11/2017 | Masurekar et al. |
| 2017/0337086 A1 | 11/2017 | Zhu et al. |
| 2017/0339054 A1 | 11/2017 | Yadav et al. |
| 2017/0339070 A1 | 11/2017 | Chang et al. |
| 2017/0364419 A1 | 12/2017 | Lo |
| 2017/0366445 A1 | 12/2017 | Nemirovsky et al. |
| 2017/0366467 A1 | 12/2017 | Martin et al. |
| 2017/0374174 A1 | 12/2017 | Evens et al. |
| 2018/0006995 A1* | 1/2018 | Bickhart ................ H04L 45/66 |
| 2018/0007123 A1 | 1/2018 | Cheng et al. |
| 2018/0013636 A1 | 1/2018 | Seetharamaiah et al. |
| 2018/0014051 A1 | 1/2018 | Phillips et al. |
| 2018/0020035 A1 | 1/2018 | Boggia et al. |
| 2018/0034668 A1 | 2/2018 | Mayya et al. |
| 2018/0041425 A1 | 2/2018 | Zhang |
| 2018/0062875 A1 | 3/2018 | Tumuluru |
| 2018/0062914 A1 | 3/2018 | Boutros et al. |
| 2018/0062917 A1 | 3/2018 | Chandrashekhar et al. |
| 2018/0063036 A1 | 3/2018 | Chandrashekhar et al. |
| 2018/0063193 A1 | 3/2018 | Chandrashekhar et al. |
| 2018/0063233 A1 | 3/2018 | Park |
| 2018/0063743 A1 | 3/2018 | Tumuluru et al. |
| 2018/0069924 A1 | 3/2018 | Tumuluru et al. |
| 2018/0074909 A1 | 3/2018 | Bishop et al. |
| 2018/0077081 A1 | 3/2018 | Lauer et al. |
| 2018/0077202 A1 | 3/2018 | Xu |
| 2018/0084081 A1 | 3/2018 | Kuchibhotla et al. |
| 2018/0097725 A1 | 4/2018 | Wood et al. |
| 2018/0114569 A1 | 4/2018 | Strachan et al. |
| 2018/0131608 A1 | 5/2018 | Jiang et al. |
| 2018/0131615 A1 | 5/2018 | Zhang |
| 2018/0131720 A1 | 5/2018 | Hobson et al. |
| 2018/0145899 A1 | 5/2018 | Rao |
| 2018/0159796 A1 | 6/2018 | Wang et al. |
| 2018/0159856 A1 | 6/2018 | Gujarathi |
| 2018/0167378 A1 | 6/2018 | Kostyukov et al. |
| 2018/0176073 A1 | 6/2018 | Dubey et al. |
| 2018/0176082 A1 | 6/2018 | Katz et al. |
| 2018/0176130 A1 | 6/2018 | Banerjee et al. |
| 2018/0213472 A1 | 7/2018 | Ishii et al. |
| 2018/0219765 A1 | 8/2018 | Michael et al. |
| 2018/0219766 A1 | 8/2018 | Michael et al. |
| 2018/0234300 A1 | 8/2018 | Mayya et al. |
| 2018/0260125 A1 | 9/2018 | Botes et al. |
| 2018/0262468 A1 | 9/2018 | Kumar et al. |
| 2018/0270104 A1 | 9/2018 | Zheng et al. |
| 2018/0278541 A1 | 9/2018 | Wu et al. |
| 2018/0295101 A1 | 10/2018 | Gehrmann |
| 2018/0295529 A1 | 10/2018 | Jen et al. |
| 2018/0302286 A1 | 10/2018 | Mayya et al. |
| 2018/0302321 A1 | 10/2018 | Manthiramoorthy et al. |
| 2018/0307851 A1 | 10/2018 | Lewis |
| 2018/0316606 A1 | 11/2018 | Sung et al. |
| 2018/0351855 A1 | 12/2018 | Sood et al. |
| 2018/0351862 A1 | 12/2018 | Jeganathan et al. |
| 2018/0351863 A1 | 12/2018 | Vairavakkalai et al. |
| 2018/0351882 A1 | 12/2018 | Jeganathan et al. |
| 2018/0367445 A1 | 12/2018 | Bajaj |
| 2018/0373558 A1 | 12/2018 | Chang et al. |
| 2018/0375744 A1 | 12/2018 | Mayya et al. |
| 2018/0375824 A1 | 12/2018 | Mayya et al. |
| 2018/0375967 A1 | 12/2018 | Pithawala et al. |
| 2019/0013883 A1 | 1/2019 | Vargas et al. |
| 2019/0014038 A1 | 1/2019 | Ritchie |
| 2019/0020588 A1 | 1/2019 | Twitchell, Jr. |
| 2019/0020627 A1 | 1/2019 | Yuan |
| 2019/0028552 A1 | 1/2019 | Johnson et al. |
| 2019/0036808 A1 | 1/2019 | Shenoy et al. |
| 2019/0036810 A1 | 1/2019 | Michael et al. |
| 2019/0036813 A1 | 1/2019 | Shenoy et al. |
| 2019/0046056 A1 | 2/2019 | Khachaturian et al. |
| 2019/0058657 A1 | 2/2019 | Chunduri et al. |
| 2019/0058709 A1 | 2/2019 | Kempf et al. |
| 2019/0068470 A1 | 2/2019 | Mirsky |
| 2019/0068493 A1 | 2/2019 | Ram et al. |
| 2019/0068500 A1 | 2/2019 | Hira |
| 2019/0075083 A1 | 3/2019 | Mayya et al. |
| 2019/0103990 A1 | 4/2019 | Cidon et al. |
| 2019/0103991 A1 | 4/2019 | Cidon et al. |
| 2019/0103992 A1 | 4/2019 | Cidon et al. |
| 2019/0103993 A1 | 4/2019 | Cidon et al. |
| 2019/0104035 A1 | 4/2019 | Cidon et al. |
| 2019/0104049 A1 | 4/2019 | Cidon et al. |
| 2019/0104050 A1 | 4/2019 | Cidon et al. |
| 2019/0104051 A1 | 4/2019 | Cidon et al. |
| 2019/0104052 A1 | 4/2019 | Cidon et al. |
| 2019/0104053 A1 | 4/2019 | Cidon et al. |
| 2019/0104063 A1 | 4/2019 | Cidon et al. |
| 2019/0104064 A1 | 4/2019 | Cidon et al. |
| 2019/0104109 A1 | 4/2019 | Cidon et al. |
| 2019/0104111 A1 | 4/2019 | Cidon et al. |
| 2019/0104413 A1 | 4/2019 | Cidon et al. |
| 2019/0109769 A1 | 4/2019 | Jain et al. |
| 2019/0140889 A1 | 5/2019 | Mayya et al. |
| 2019/0158371 A1 | 5/2019 | Dillon et al. |
| 2019/0158605 A1 | 5/2019 | Markuze et al. |
| 2019/0199539 A1 | 6/2019 | Deng et al. |
| 2019/0220703 A1 | 7/2019 | Prakash et al. |
| 2019/0238364 A1 | 8/2019 | Boutros et al. |
| 2019/0238446 A1 | 8/2019 | Barzik et al. |
| 2019/0238449 A1 | 8/2019 | Michael et al. |
| 2019/0238450 A1 | 8/2019 | Michael et al. |
| 2019/0238483 A1 | 8/2019 | Marichetty et al. |
| 2019/0268421 A1 | 8/2019 | Markuze et al. |
| 2019/0268973 A1 | 8/2019 | Bull et al. |
| 2019/0280962 A1 | 9/2019 | Michael et al. |
| 2019/0280963 A1 | 9/2019 | Michael et al. |
| 2019/0280964 A1 | 9/2019 | Michael et al. |
| 2019/0306197 A1 | 10/2019 | Degioanni |
| 2019/0313907 A1 | 10/2019 | Khachaturian et al. |
| 2019/0319847 A1 | 10/2019 | Nahar et al. |
| 2019/0334820 A1 | 10/2019 | Zhao |
| 2019/0342219 A1 | 11/2019 | Liu et al. |
| 2019/0356736 A1 | 11/2019 | Narayanaswamy et al. |
| 2019/0364099 A1 | 11/2019 | Thakkar et al. |
| 2019/0372888 A1 | 12/2019 | Michael et al. |
| 2019/0372889 A1 | 12/2019 | Michael et al. |
| 2019/0372890 A1 | 12/2019 | Michael et al. |
| 2020/0014615 A1 | 1/2020 | Michael et al. |
| 2020/0014616 A1 | 1/2020 | Michael et al. |

(56) References Cited

U.S. PATENT DOCUMENTS

| | | |
|---|---|---|
| 2020/0014661 A1 | 1/2020 | Mayya et al. |
| 2020/0021514 A1 | 1/2020 | Michael et al. |
| 2020/0021515 A1 | 1/2020 | Michael et al. |
| 2020/0036624 A1 | 1/2020 | Michael et al. |
| 2020/0059420 A1 | 2/2020 | Abraham |
| 2020/0059459 A1 | 2/2020 | Abraham et al. |
| 2020/0092207 A1 | 3/2020 | Sipra et al. |
| 2020/0097327 A1 | 3/2020 | Beyer et al. |
| 2020/0099659 A1 | 3/2020 | Cometto et al. |
| 2020/0106696 A1 | 4/2020 | Michael et al. |
| 2020/0106706 A1 | 4/2020 | Mayya et al. |
| 2020/0119952 A1 | 4/2020 | Mayya et al. |
| 2020/0127905 A1 | 4/2020 | Mayya et al. |
| 2020/0153736 A1 | 5/2020 | Liebherr et al. |
| 2020/0169473 A1 | 5/2020 | Rimar et al. |
| 2020/0177503 A1 | 6/2020 | Hooda et al. |
| 2020/0204460 A1 | 6/2020 | Schneider et al. |
| 2020/0213212 A1 | 7/2020 | Dillon et al. |
| 2020/0213224 A1 | 7/2020 | Cheng et al. |
| 2020/0218558 A1 | 7/2020 | Sreenath et al. |
| 2020/0235990 A1 | 7/2020 | Janakiraman et al. |
| 2020/0235999 A1 | 7/2020 | Mayya et al. |
| 2020/0236046 A1 | 7/2020 | Jain et al. |
| 2020/0244721 A1 | 7/2020 | S et al. |
| 2020/0252234 A1 | 8/2020 | Ramamoorthi et al. |
| 2020/0259700 A1 | 8/2020 | Bhalla et al. |
| 2020/0267184 A1 | 8/2020 | Vera-Schockner |
| 2020/0280587 A1 | 9/2020 | Janakiraman et al. |
| 2020/0287819 A1 | 9/2020 | Theogaraj et al. |
| 2020/0287976 A1 | 9/2020 | Theogaraj et al. |
| 2020/0296011 A1 | 9/2020 | Jain et al. |
| 2020/0296026 A1 | 9/2020 | Michael et al. |
| 2020/0314006 A1 | 10/2020 | Mackie et al. |
| 2020/0314614 A1 | 10/2020 | Moustafa et al. |
| 2020/0336336 A1 | 10/2020 | Sethi et al. |
| 2020/0344163 A1 | 10/2020 | Gupta et al. |
| 2020/0351188 A1 | 11/2020 | Arora et al. |
| 2020/0366530 A1 | 11/2020 | Mukundan et al. |
| 2020/0366562 A1 | 11/2020 | Mayya et al. |
| 2020/0382345 A1 | 12/2020 | Zhao et al. |
| 2020/0382387 A1 | 12/2020 | Pasupathy et al. |
| 2020/0412576 A1 | 12/2020 | Kondapavuluru et al. |
| 2020/0413283 A1 | 12/2020 | Shen et al. |
| 2021/0006482 A1 | 1/2021 | Hwang et al. |
| 2021/0006490 A1 | 1/2021 | Michael et al. |
| 2021/0029088 A1 | 1/2021 | Mayya et al. |
| 2021/0036888 A1 | 2/2021 | Makkalla et al. |
| 2021/0067372 A1 | 3/2021 | Cidon et al. |
| 2021/0067373 A1 | 3/2021 | Cidon et al. |
| 2021/0067374 A1 | 3/2021 | Cidon et al. |
| 2021/0067375 A1 | 3/2021 | Cidon et al. |
| 2021/0067407 A1 | 3/2021 | Cidon et al. |
| 2021/0067427 A1 | 3/2021 | Cidon et al. |
| 2021/0067461 A1 | 3/2021 | Cidon et al. |
| 2021/0067464 A1 | 3/2021 | Cidon et al. |
| 2021/0067467 A1 | 3/2021 | Cidon et al. |
| 2021/0067468 A1 | 3/2021 | Cidon et al. |
| 2021/0126853 A1 | 4/2021 | Ramaswamy et al. |
| 2021/0126854 A1 | 4/2021 | Guo et al. |
| 2021/0126860 A1 | 4/2021 | Ramaswamy et al. |
| 2021/0144091 A1 | 5/2021 | H et al. |
| 2021/0160813 A1 | 5/2021 | Gupta et al. |
| 2021/0194814 A1 | 6/2021 | Roux et al. |
| 2021/0226880 A1 | 7/2021 | Ramamoorthy et al. |
| 2021/0279069 A1 | 9/2021 | Salgaonkar et al. |
| 2021/0377109 A1 | 12/2021 | Shrivastava et al. |

FOREIGN PATENT DOCUMENTS

| | | |
|---|---|---|
| CN | 104956329 A | 9/2015 |
| EP | 1912381 A1 | 4/2008 |
| EP | 3041178 A1 | 7/2016 |
| EP | 3509256 A1 | 7/2019 |
| EP | 3665865 A1 | 6/2020 |
| RU | 2574350 C2 | 2/2016 |
| WO | 03073701 | 9/2003 |
| WO | 2012167184 A2 | 12/2012 |
| WO | 2017083975 A1 | 5/2017 |
| WO | 2019070611 A1 | 4/2019 |
| WO | 2019094522 A1 | 5/2019 |
| WO | 2020012491 A1 | 1/2020 |
| WO | 2020018704 A1 | 1/2020 |
| WO | 2020101922 A1 | 5/2020 |
| WO | 2020112345 A1 | 6/2020 |
| WO | 2021040934 A1 | 3/2021 |

OTHER PUBLICATIONS

Non-Published commonly Owned U.S. Appl. No. 15/701,115, filed Sep. 11, 2017, 21 pages, Micira, Inc.
Non-Published commonly Owned U.S. Appl. No. 15/784,404, filed Oct. 16, 2017, 21 pages, Micira, Inc.
Non-Published commonly Owned U.S. Appl. No. 15/838,052, filed Dec. 11, 2017, 28 pages, Micira, Inc.
Petition for Post-Grant Review of U.S. Pat. No. 9,722,815, filed May 1, 2018, 106 pages.
Mudigonda, Jayaram, et al., "NetLord: A Scalable Multi-Tenant Network Architecture for Virtualized Datacenters," Proceedings of the ACM SIGCOMM 2011 Conference, Aug. 15-19, 2011, 12 pages, ACM, Toronto, Canada.
PCT Invitation to Pay Additional Fees for Commonly Owned International Patent Application PCT/US2018/059708, dated Feb. 13, 2019, 14 pages, International Searching Authority (EPO).
Del Piccolo, Valentin, et al., "A Survey of Network Isolation Solutions for Multi-Tenant Data Centers," IEEE Communications Society, Apr. 20, 2016, vol. 18, No. 4, 37 pages, IEEE.
Fortz, Bernard, et al., "Internet Traffic Engineering by Optimizing OSPF Weights," Proceedings IEEE INFOCOM 2000, Conference on Computer Communications, Nineteenth Annual Joint Conference of the IEEE Computer and Communications Societies, Mar. 26-30, 2000, 11 pages, IEEE, Tel Aviv, Israel, Israel.
Francois, Frederic, et al., "Optimizing Secure SDN-enabled Inter-Data Centre Overlay Networks through Cognitive Routing," 2016 IEEE 24th International Symposium on Modeling, Analysis and Simulation of Computer and Telecommunication Systems (MAS-COTS), Sep. 19-21, 2016, 10 pages, IEEE, London, UK.
Michael, Nithin, et al., "HALO: Hop-by-Hop Adaptive Link-State Optimal Routing," IEEE/ACM Transactions on Networking, Dec. 2015, 14 pages, vol. 23, No. 6, IEEE.
Mishra, Mayank, et al., "Managing Network Reservation for Tenants in Oversubscribed Clouds," 2013 IEEE 21st International Symposium on Modelling, Analysis and Simulation of Computer and Telecommunication Systems, Aug. 14-16, 2013, 10 pages, IEEE, San Francisco, CA, USA.
Ray, Saikat, et al., "Always Acyclic Distributed Path Computation," University of Pennsylvania Department of Electrical and Systems Engineering Technical Report, May 2008, 16 pages, University of Pennsylvania ScholarlyCommons.
Webb, Kevin C., et al., "Blender: Upgrading Tenant-Based Data Center Networking," 2014 ACM/IEEE Symposium on Architectures for Networking and Communications Systems (ANCS), Oct. 20-21, 2014, 11 pages, IEEE, Marina del Rey, CA, USA.
Yap, Kok-Kiong, et al., "Taking the Edge off with Espresso: Scale, Reliability and Programmability for Global Internet Peering," SIGCOMM '17: Proceedings of the Conference of the ACM Special Interest Group on Data Communication, Aug. 21-25, 2017, 14 pages, Los Angeles, CA.
Non-Published Commonly Owned U.S. Appl. No. 17/068,603, filed Oct. 12, 2020, 37 pages, Nicira, Inc.
Non-Published Commonly Owned U.S. Appl. No. 15/803,964, (MODE.P004) filed Nov. 6, 2017, 15 pages, The Mode Group.
Non-Published Commonly Owned U.S. Appl. No. 16/216,235 (MODE.P004C1), filed Dec. 11, 2018, 19 pages, The Mode Group.
Non-Published Commonly Owned U.S. Appl. No. 16/818,862 (MODE.P001 C1), filed Mar. 13, 2020, 198 pages, The Mode Group.
Huang, Cancan, et al., "Modification of Q.SD-WAN," Rapporteur Group Meeting—Doc, Study Period 2017-2020, Q4/11-DOC1 (Apr.

(56) References Cited

OTHER PUBLICATIONS 19, 2010), Study Group 11, Apr. 10, 2019, 19 pages, International Telecommunication Union, Geneva, Switzerland.

Non-Published Commonly Owned U.S. Appl. No. 17/187,913, filed Mar. 1, 2021, 27 pages, Nicira, Inc.

Guo, Xiangyi, et al., (U.S. Appl. No. 62/925,193) filed Oct. 23, 2019, 26 pages.

Lasserre, Marc, et al., "Framework for Data Center (DC) Network Virtualization," RFC 7365, Oct. 2014, 26 pages, IETF.

Lin, Weidong, et al., "Using Path Label Routing in Wide Area Software-Defined Networks with Open Flow," 2016 International Conference on Networking and Network Applications, Jul. 2016, 6 pages, IEEE.

Sarhan, Soliman Abd Elmonsef, et al., "Data Inspection in SDN Network," 2018 13th International Conference an Computer Engineering and Systems (ICCES), Dec. 18-19, 2018, 6 pages, IEEE, Cairo, Egypt.

Xie, Junfeng, et al., A Survey of Machine Learning Techniques Applied to Software Defined Networking (SDN): Research Issues and Challenges, IEEE Communications Surveys & Tutorials, Aug. 23, 2018, 38 pages, vol. 21, Issue 1, IEEE.

Cox, Jacob H., et al., "Advancing Software-Defined Networks: A Survey," IEEE Access, Oct. 12, 2017, 40 pages, vol. 5, IEEE, retrieved from https://ieeexplore.ieee.org/document/8066287.

Noormohammadpour, Mohammad, et al., "DCRoute: Speeding up Inter-Datacenter Traffic Allocation while Guaranteeing Deadlines," 2016 IEEE 23rd International Conference on High Performance Computing (HiPC), Dec. 19-22, 2016, 9 pages, IEEE, Hyderabad, India.

* cited by examiner

METHOD AND SYSTEM OF A DYNAMIC HIGH-AVAILABILITY MODE BASED ON CURRENT WIDE AREA NETWORK CONNECTIVITY

CLAIM OF PRIORITY

This application claims priority to U.S. Provisional Patent Application No. 62/583,733, titled METHOD AND SYSTEM OF A HIGH AVAILABILITY ENHANCEMENTS TO A COMPUTER NETWORK filed on 9 Nov. 2017. This application is hereby incorporated by reference in its entirety.

BACKGROUND

FIG. 1 (prior art) illustrates an example High Availability (HA) network topology 100, according to some embodiments. There may be two key deficiencies in HA network topology 100 which are addressed by the enhancements in FIGS. 2-10. A first deficiency can include the requirement of a switch on the WAN side of the HA pair (e.g. first edge device 112 and second edge device 114). The WAN can include MPLS 102 and Internet 108. A single switch may introduce a single point of failure in actuality two WAN-side switches are required for full redundancy. The addition of two switches (e.g. switches 116 and 120) may increases the complexity of the insertion without providing any real benefit. After the installation of an Edge Router, a customer may be responsible for the switch.

Additionally, unpredictable behavior in split brain scenarios may arise. Typically the switches may run a Spanning Tree Protocol to prevent loops in the network. If both devices go active (e.g. HA cable 118 is disconnected), then each switch may block a different device, causing a total loss of traffic through the pair.

BRIEF SUMMARY OF THE INVENTION

In one aspect, a computer-networking method useful for implementing dynamic high-availability (HA) mode based on current wide area network (WAN) connectivity, comprising the steps of: providing a first edge device of a local area network (LAN) with the WAN; providing a second edge device of the LAN with the WAN; and synchronizing a state of plurality of links with the WAN that are connected to the first edge device and the second edge device.

The computerized method can further detect that the plurality of links are connected to the second edge device and not the first edge device.

Figure 1:
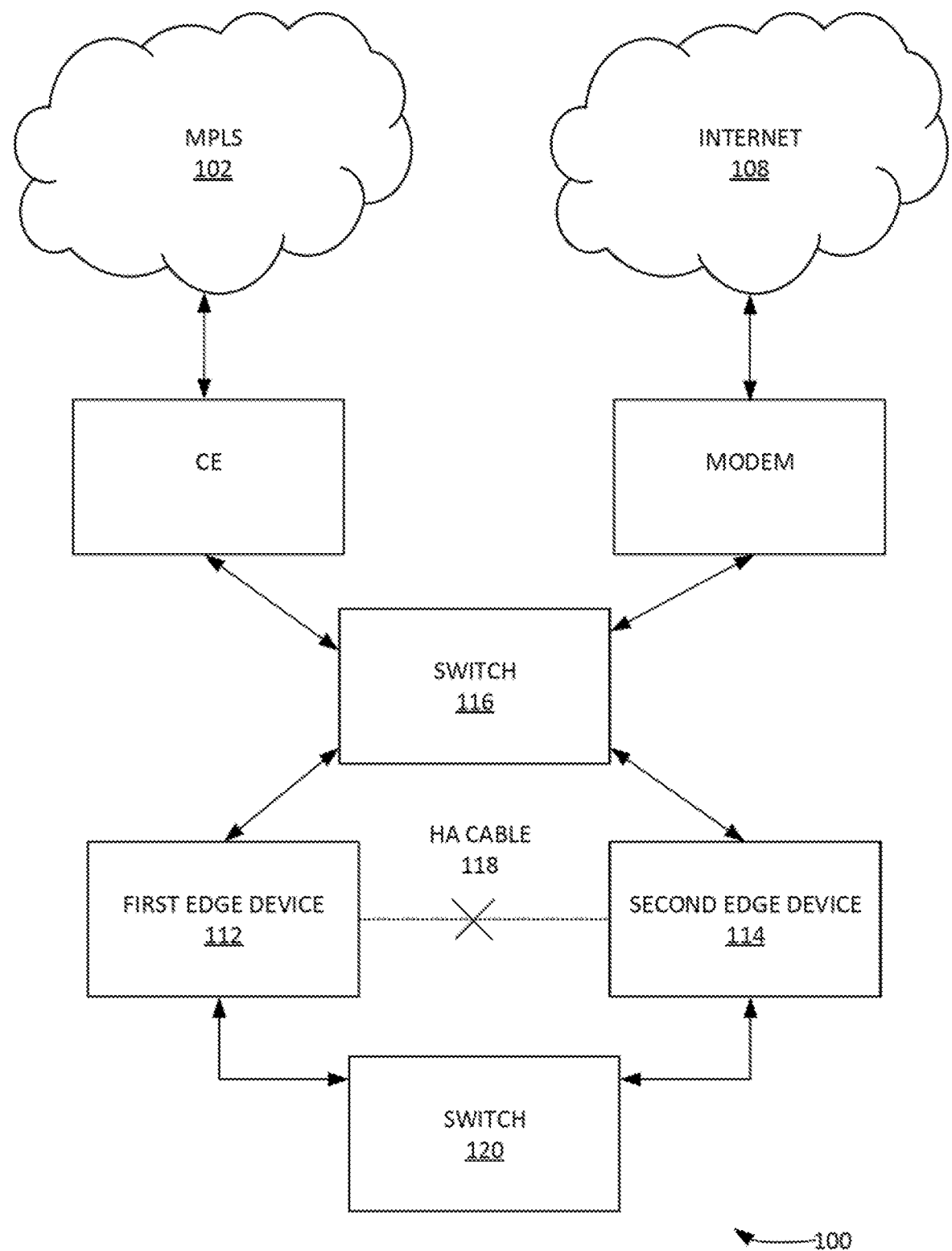
FIG. 1 (prior art) illustrates an example High Availability (HA) network topology, according to some embodiments.

The Figures described above are a representative set, and are not exhaustive with respect to embodying the invention.

DESCRIPTION

Disclosed are a system, method, and article of manufacture for dynamic high-availability mode based on current wide area network connectivity. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Address Resolution Protocol (ARP) is a communications protocol used for discovering the link layer address associated with a given Internet layer address, a critical function in the Internet protocol suite.

CE router (customer edge router) can be a router located on the customer premises that provides an Ethernet interface between the customer's LAN and the provider's core network. CE routers can be a component in an MPLS architecture.

Dynamic tunneling can refer to MultiPath tunnels (i.e. paths) that are established on-demand between two endpoints when there is VPN traffic to be sent between two Edges, and torn down after VPN traffic is completed.

Edge device can be a device that provides an entry point into enterprise or service provider core networks. An edge device can be software running in a virtual machine (VM) located in a branch office and/or customer premises.

Gateway can be a node (e.g. a router) on a computer network that serves as an access point to another network.

LAN is a local area network, a computer network covering a small local area.

Multiprotocol Label Switching (MPLS) is a type of data-carrying technique for high-performance telecommunications networks. MPLS directs data from one network node to the next based on short path labels rather than long network addresses, avoiding complex lookups in a routing table. The labels identify virtual links (paths) between distant nodes rather than endpoints. MPLS can encapsulate packets of various network protocols.

Orchestrator can include a software component that provides multi-tenant and role based centralized configuration management and visibility.

Split brain can refer to data or availability inconsistencies originating from the maintenance of two separate data sets with overlap in scope, either because of servers in a network design, or a failure condition based on servers not communicating and synchronizing their data to each other.

Tunneling protocol can allow a network user to access or provide a network service that the underlying network does not support or provide directly.

Wide area network (WAN) is a telecommunications network or computer network that extends over a large geographical distance.

Virtual private network (VPN) can extend a private network across a public network, such as the Internet. It can enable users to send and receive data across shared or public networks as if their computing devices were directly connected to the private network, and thus benefit from the functionality, security and management policies of the private network.

Additional example definitions are provided herein.

EXAMPLES SYSTEMS AND PROCESSES

It is noted that the following systems and methods are backwards compatible with existing HA deployments, thus requiring no changes to existing user interfaces.

Figure 2:
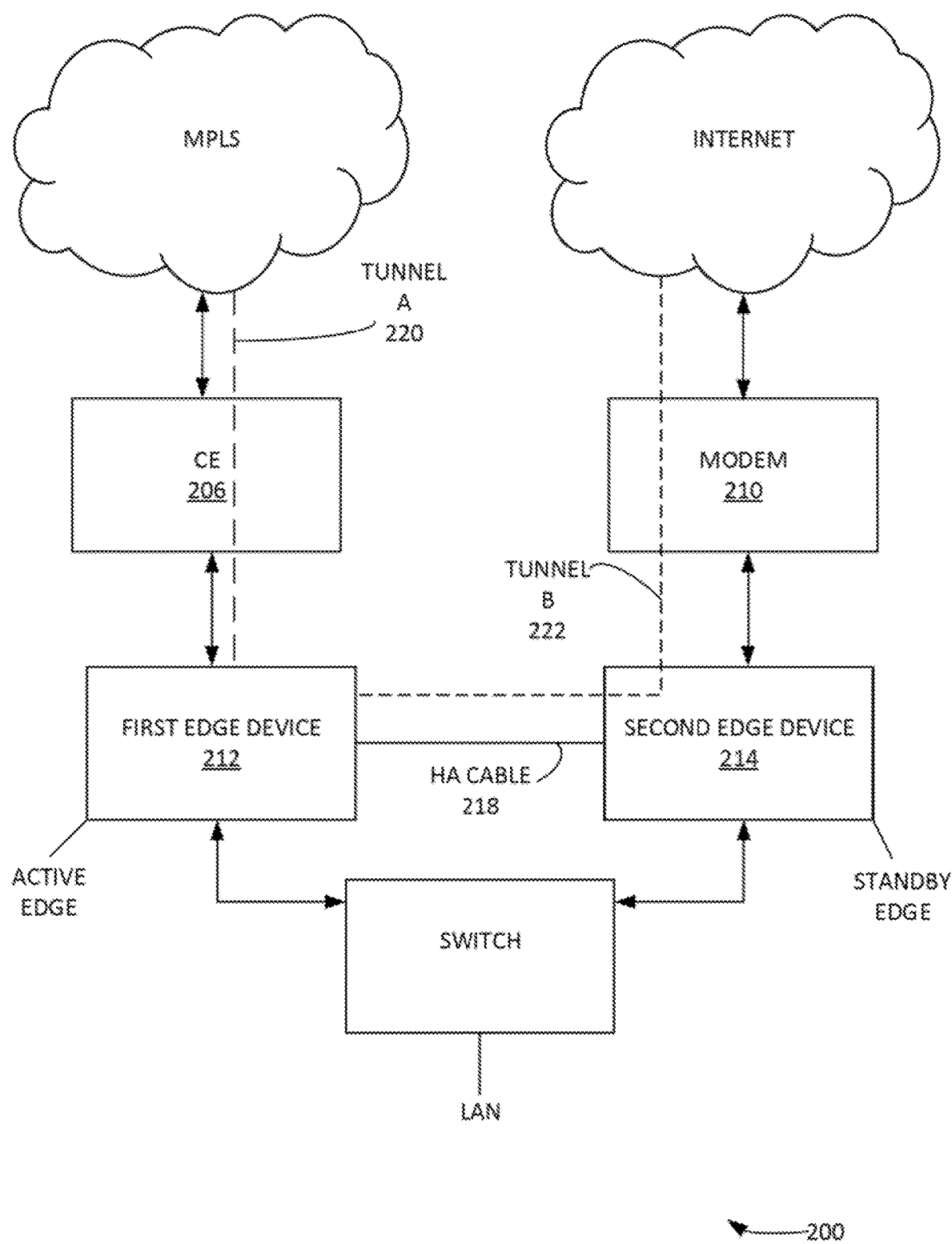
FIG. 2 illustrates an example network topology with a switch on a WAN side of a HA pair, according to some embodiments.

FIG. 2 illustrates an example network topology 200 with a switch on a WAN side of a HA pair, according to some embodiments. It is noted that an HA switch may no longer be required on the WAN side of the HA pair. Instead, a customer can connect one or more WAN links to each of the edge devices 212, 214 in the pair (e.g. via customer router 206 and/or modem 210). The devices can then synchronize their connected interface status. If the active edge device 212 or both edge devices 212, 214 have the same interface connected, then this can be initiated directly. If only a standby edge 214 has an interface connected, then connectivity can be enabled through the standby edge 214 by bridging the tunnels (e.g. tunnel B 222 to tunnel A 220) across the HA cable 218 and out the peer WAN link.

Now that each of the edge devices 212, 214 has its own individual set of WAN connections, a split-brain scenario can be easily determined by a gateway which has a full view of what is happening from the perspective of both edge devices 212, 214.

It is noted that each of the edge devices 212, 214 has its own individual set of WAN connections, a split-brain scenario can be determined by the Gateway. The Gateway can have a full view of the state of each of the edge devices 212, 214 from the perspective of both edge devices 212, 214.

Figure 3:
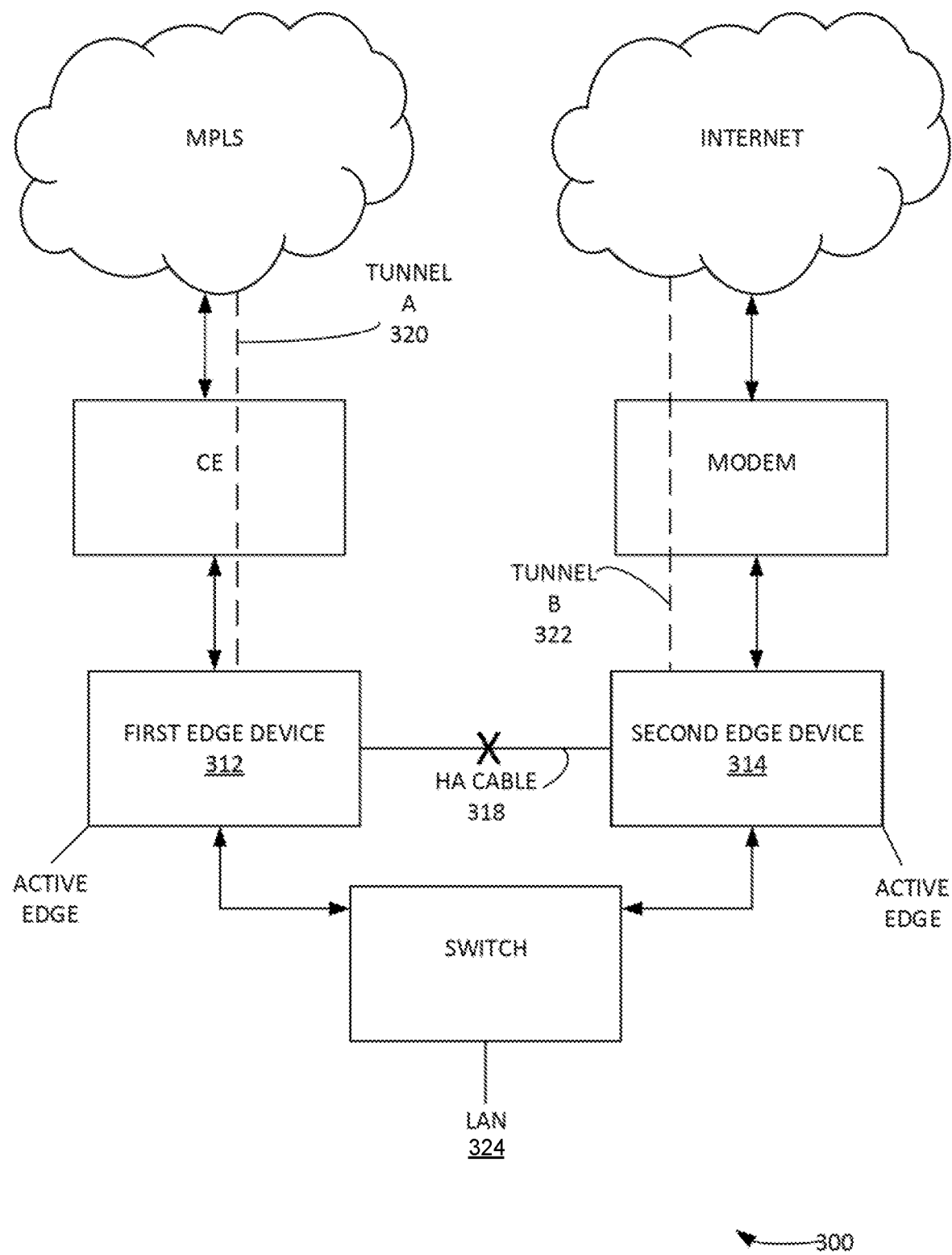
FIG. 3 illustrates an example network topology, according to some embodiments.

FIG. 3 illustrates an example network topology 300, according to some embodiments. As shown, a high availability (HA) cable 318 can be disconnected. Each of the edge devices 312, 314 can establish a tunnel (e.g. tunnels A and B 320, 322) directly with a gateway system. The gateway system can determine that an edge is connected, active and passing traffic. The gateway system can open a tunnel to the second edge. The gateway system can signal to the edge to go to standby on the local LAN 324. If it is detected that the edge loses connectivity, then the gateway system can signal to the other edge to become the active edge. Network topology 300 can be used to implement process 1000 provided below.

A dynamic HA mode based on current WAN connectivity can be implemented. It is noted that a WAN switch is no longer required for HA deployments as links may be connected to individual edge devices. This can be accomplished by leveraging the link state which is already synchronized between the edge devices and, using a standby edge as a virtual switch to reach links attached to the standby edge only.

Figure 4A:
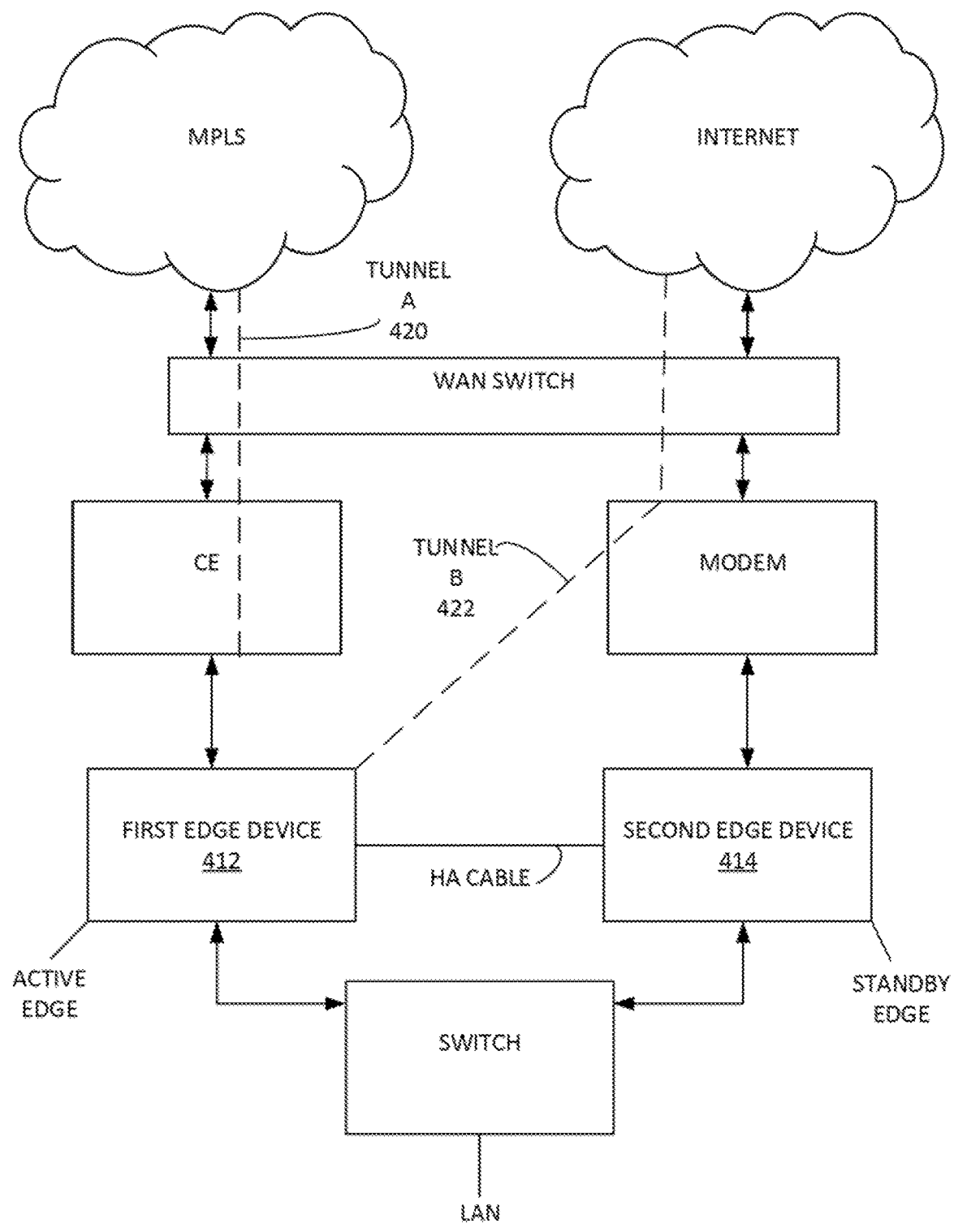
FIGS. 4 A-B illustrates a network topology illustrating a first use case that covers edge device with shared links, according to some embodiments.
Figure 4B:
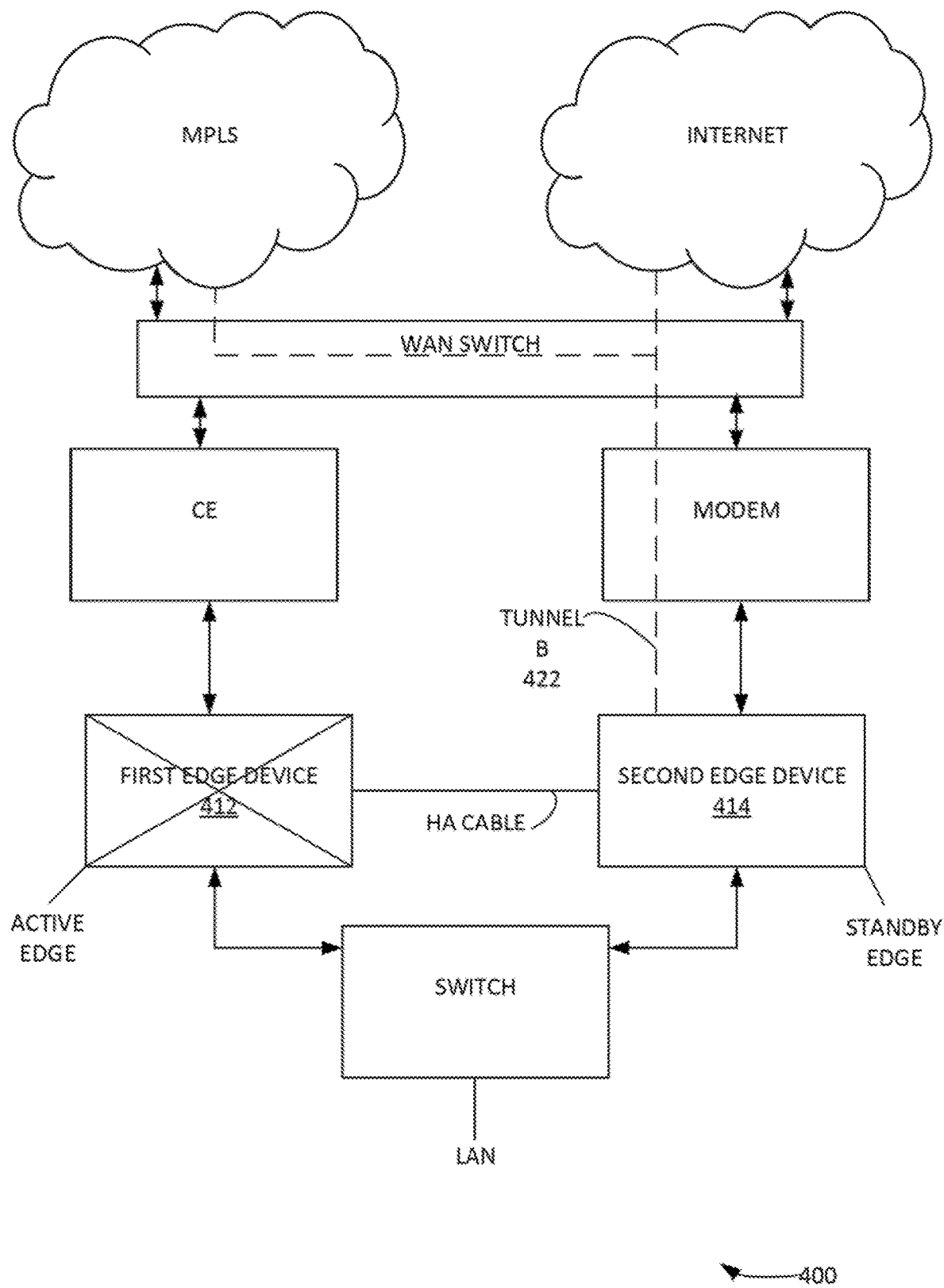

FIGS. 4 A-B illustrates a network topology 400 illustrating a first use case that covers edge device with shared links (e.g. backwards compatibility), according to some embodiments. More specifically, FIG. 4A illustrates an initial state and FIG. 4B illustrates an HA failover state. The first edge device 412 can have two links connected while the second edged device 414 only has one link connected. Accordingly, the first edge device 412 can be the preferred edge and by default the active edge. As the first edge device 412 has local connectivity to both links, both tunnels (e.g. tunnels A and B 420 422) can be initiated directly from the first edge device 412. If there is an HA failover, the second edge device 414 can only have access to the link that is directly connected to it.

Figure 5A:
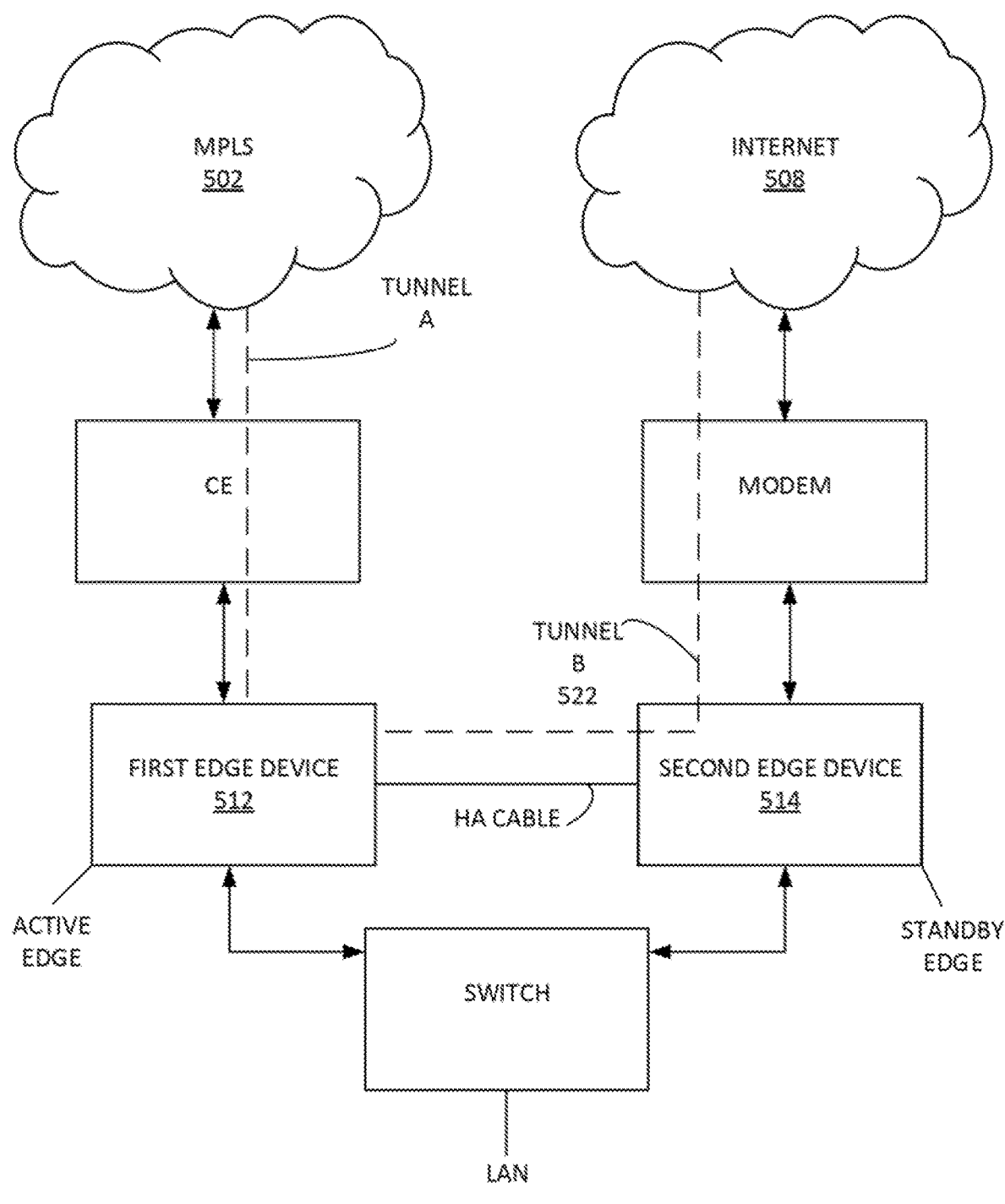
FIGS. 5 A-B illustrate network topology illustrating a second use case that includes a scenario where there is only one link connected to each edge device (e.g. edge devices with unique links), according to some embodiments.
Figure 5B:
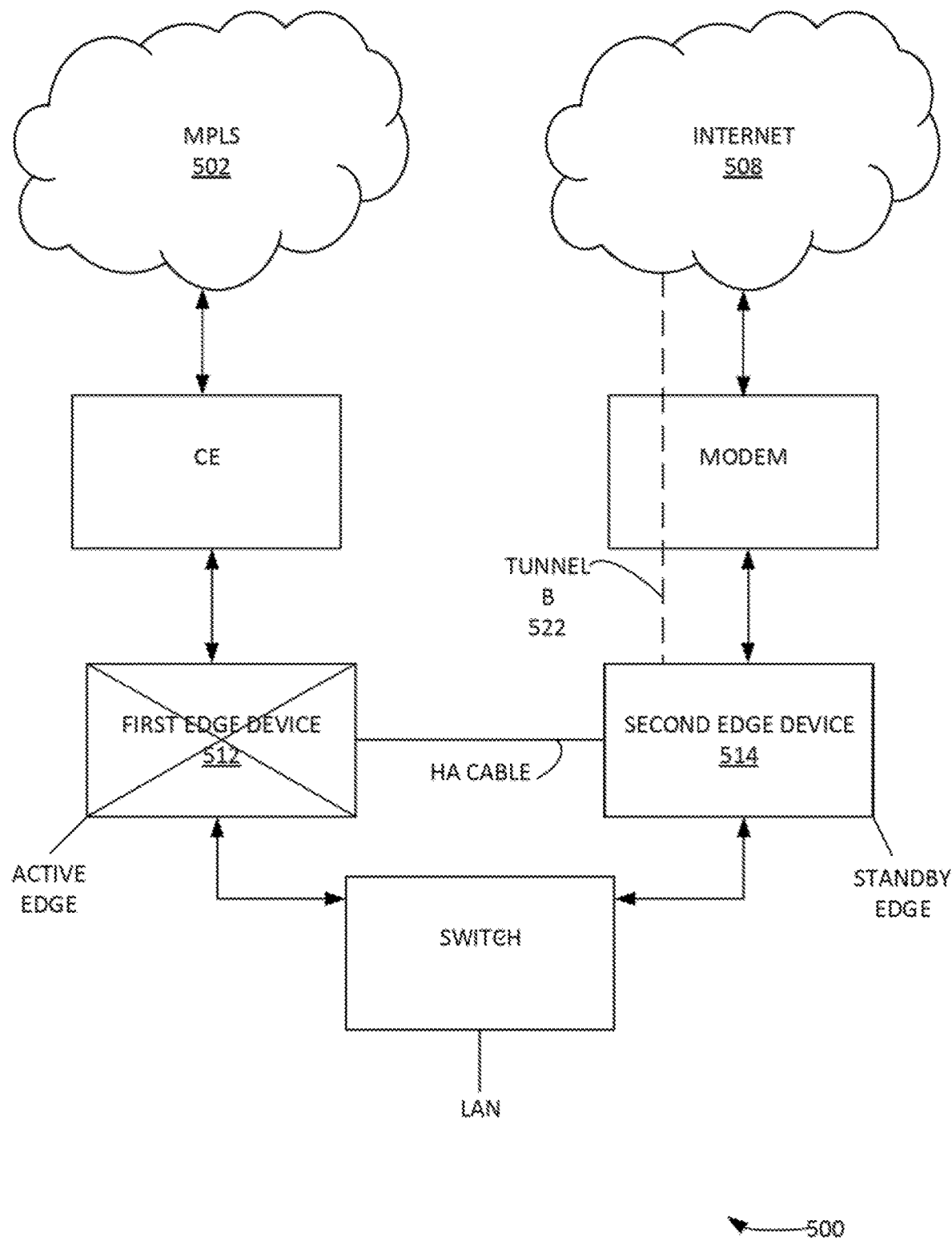

FIGS. 5 A-B illustrate network topology 500 illustrating a second use case that includes a scenario where there is only one link connected to each edge device (e.g. edge devices with unique links), according to some embodiments. More specifically, FIG. 5A illustrates an initial state and FIG. 5B illustrates an HA failover state. The first edge device 512 can have MPLS 502 connected and the second edge device 514 has the public internet 508 connected. Accordingly, the first edge device 512 the preferred edge and by default the active edge. As the first edge device 512 does not have local connectivity to the internet link, that tunnel (e.g. tunnel B 522) can be initiated by proxying through the second edge device 514. If there is an HA failover, the second edge device 514 can only have access to a link with which it is directly connected.

Figure 6:
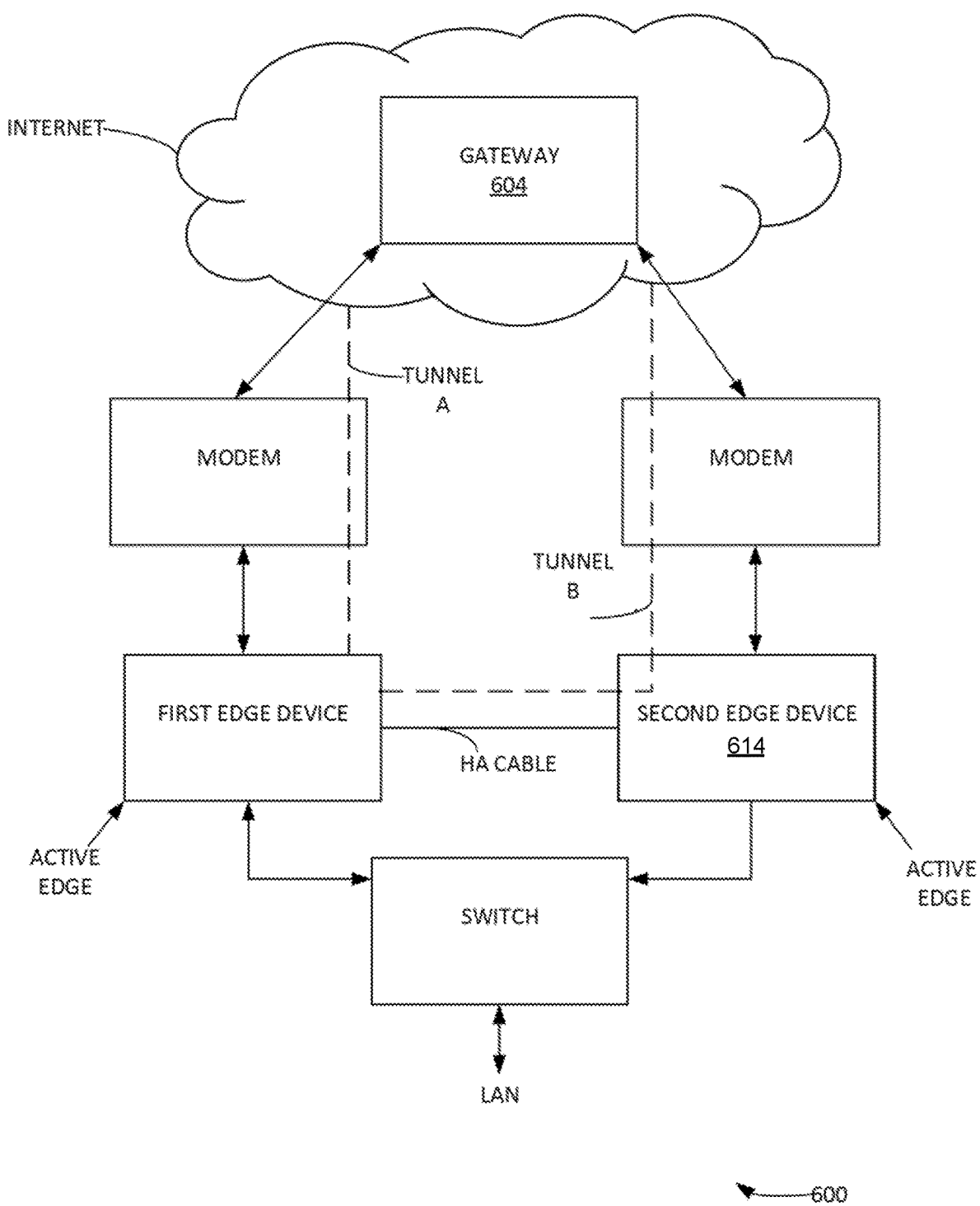
FIG. 6 illustrates another example network topology, according to some embodiments.

FIG. 6 illustrates another example network topology 600, according to some embodiments. As noted in FIGS. 5 A-B, an edge device can be connected to two WAN links. A first WAN link can be connected locally, and a second WAN link can be proxied via the second edge device 614. For simplicity this can be presented as two public Internet links, however it could also be accomplished with hybrid links, as long as, a private WAN link can reach a gateway 604 (e.g. partner gateway deployment, SD-WAN service reachable enabled, etc.).

Figure 7:
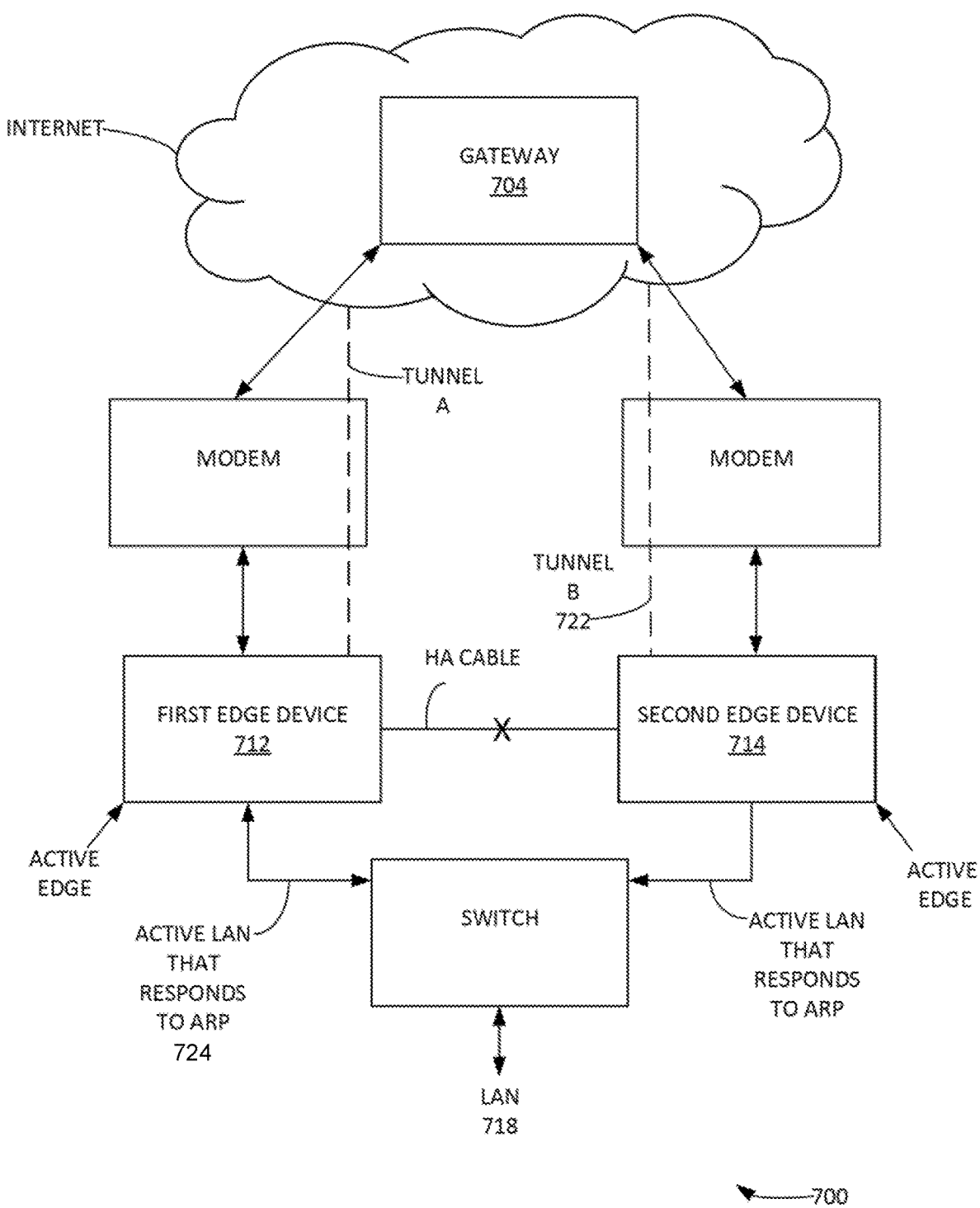
FIG. 7 illustrates another example network topology with an active LAN, according to some embodiments.
Figure 8:
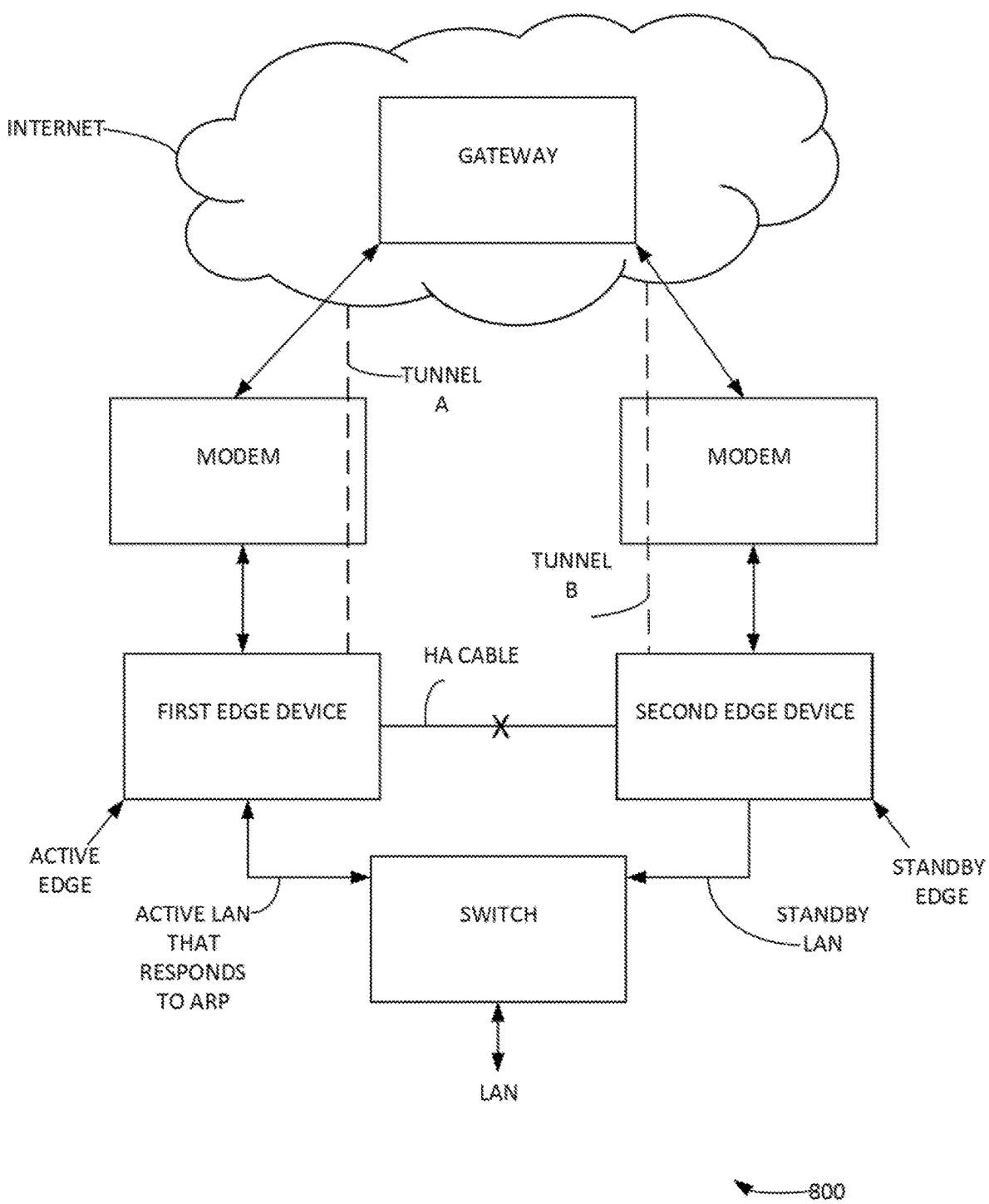
FIG. 8 illustrates yet another example network topology, according to some embodiments.

FIG. 7 illustrates another example network topology 700 with an active LAN, according to some embodiments. Gateway 704 can have a pre-existing connection to a first edge device 712. Edge device 712 can be the preferred active edge. Second edge device 714 (e.g. with the same logical ID) can be connected on a different WAN link. Gateway 704 can maintain tunnel B 722 as an active tunnel for future use. Gateway 704 can signal the second edge device 714 to go into standby mode on the LAN. This process can be used to logically prevent the split-brain scenario from occurring. LAN 718 can connect with edge devices 712, 714 via active LAN that responds to ARP 724. FIG. 8 illustrates yet another example network topology 800, according to some embodiments.

Figure 9:
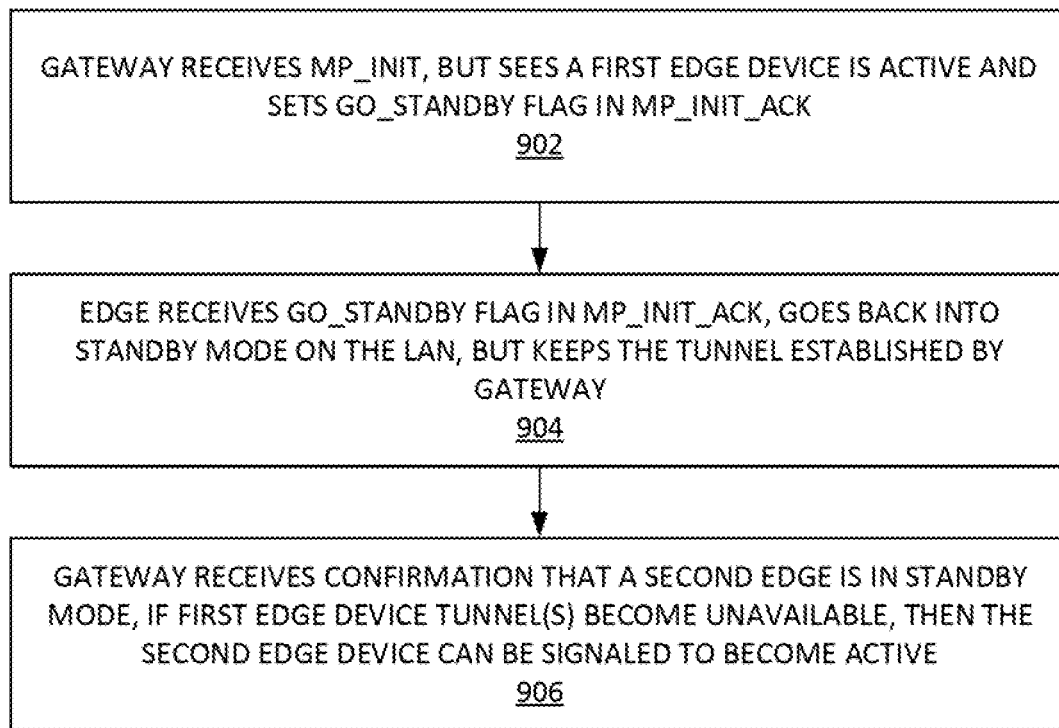
FIG. 9 illustrates an example communication exchange process, according to some embodiments.

FIG. 9 illustrates an example communication exchange process 900, according to some embodiments. In step 902, gateway receives MP_INIT, but sees a first edge device is active and sets GO_STANDBY flag in MP_INIT_ACK. In step 904, edge receives GO_STANDBY flag in MP_INIT_ACK, goes back into standby mode on the LAN, but keeps the tunnel established by gateway. In step 906, the gateway receives confirmation that a second edge device is in standby mode. If first edge device tunnel(s) become unavailable, then the second edge device can be signaled to become active. Following the exchange, the split-brain scenario can have been cleared. For example, Gateway receives tunnel initiation request from 714 but sees that 712 is already active. The Gateway responds to the tunnel initiation request but sets a flag in the response indicating that the 714 device can go into a standby mode on the LAN.

Figure 10:
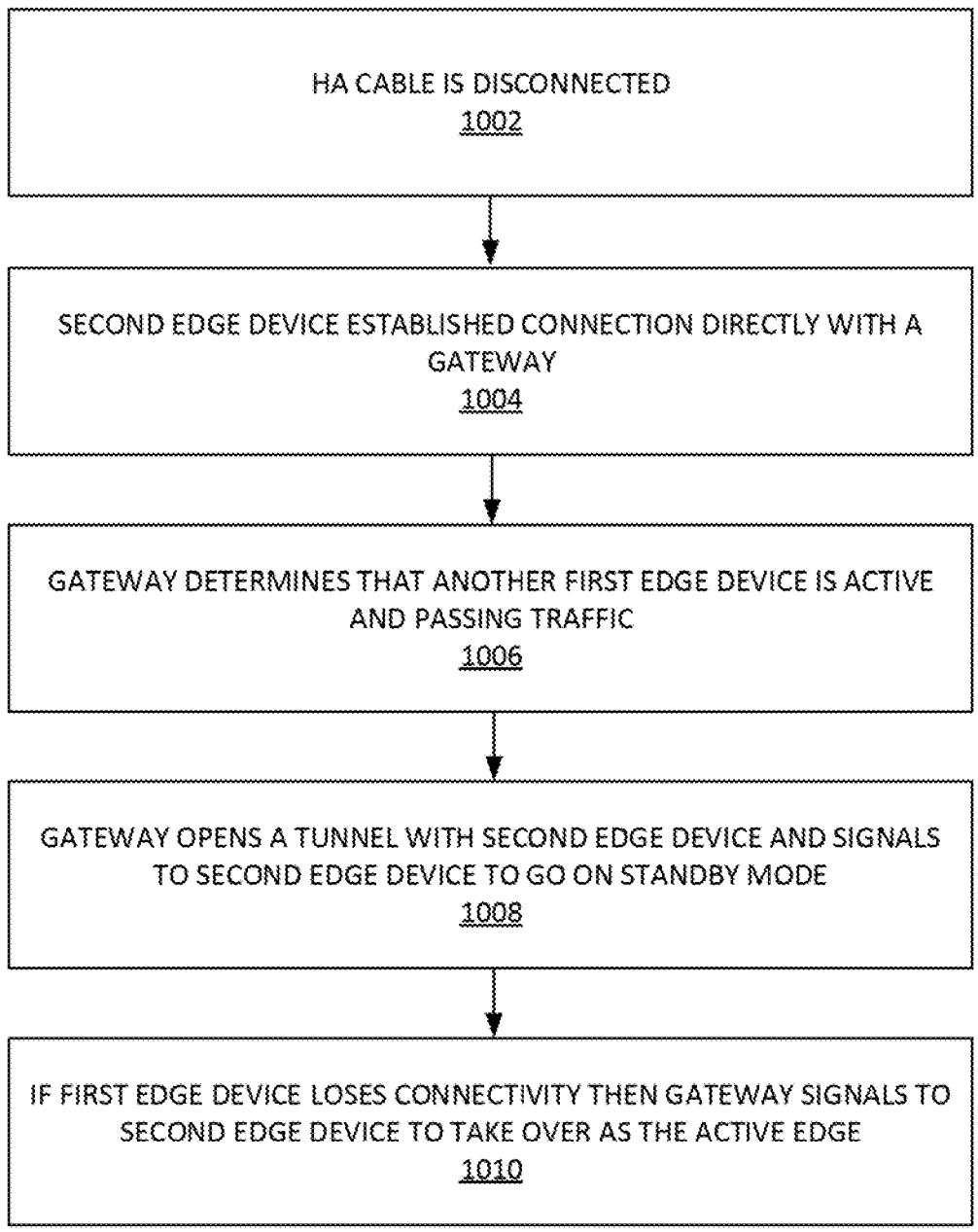
FIG. 10 illustrates an example process for implementing dynamic HA mode based process on current WAN connectivity, according to some embodiments.

FIG. 10 illustrates an example process for implementing dynamic HA mode based process 1000 on current WAN connectivity, according to some embodiments. In step 1002, the HA cable can be disconnected. In step 1004, the second edge device established a communicative network connection directly with a gateway system. In step 1006, the gateway determines that another first edge device is active and passing network traffic to a LAN. In step 1008, the gateway opens a tunnel with second edge device and signals to second edge device to go on standby mode. In step 1010, if the first edge device loses connectivity then gateway signals to second edge device to take over as the active edge.

Figure 11:
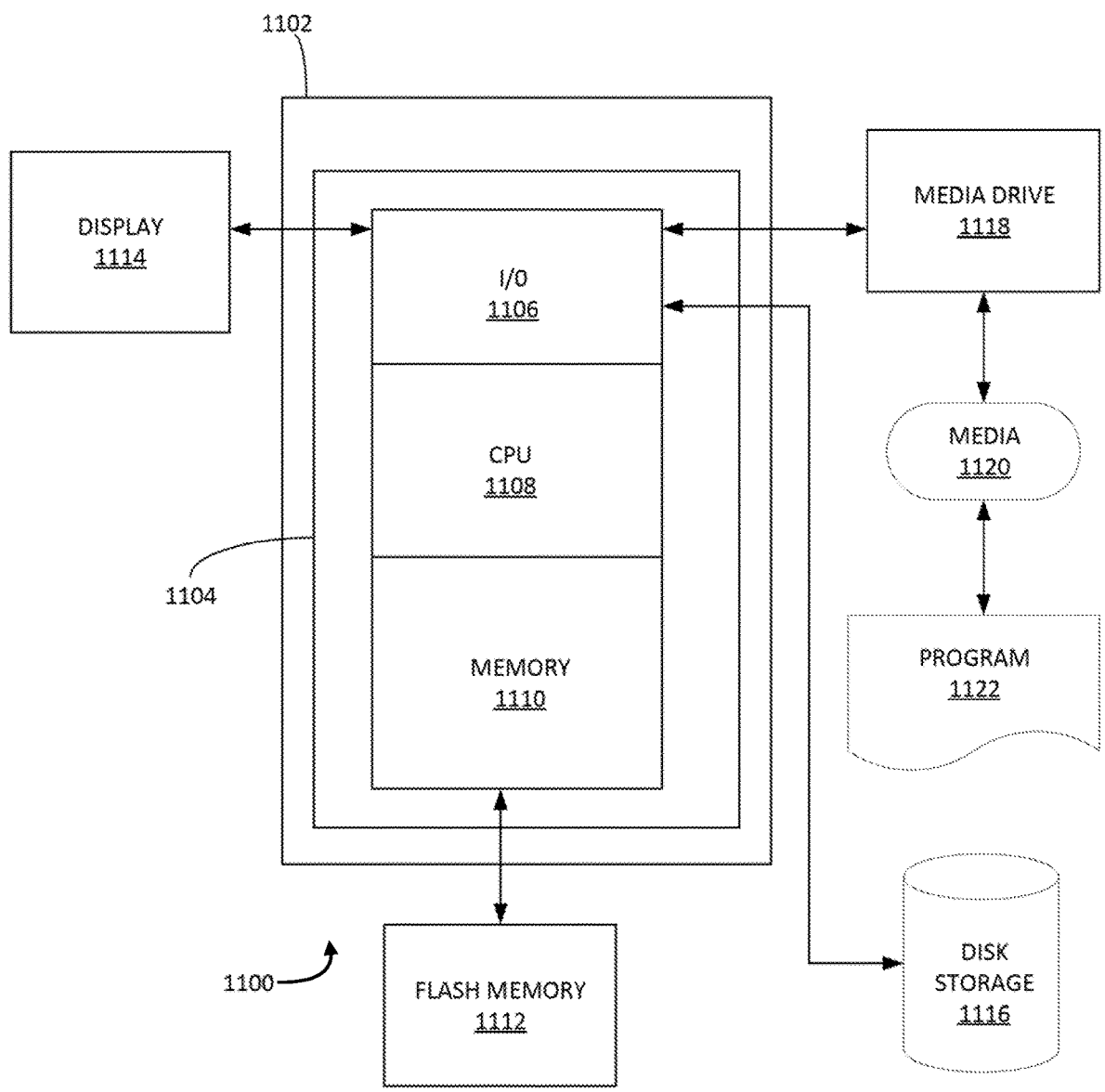
FIG. 11 depicts an exemplary computing system that can be configured to perform any one of the processes provided herein.

FIG. 11 depicts an exemplary computing system 1100 that can be configured to perform any one of the processes provided herein. In this context, computing system 1100 may include, for example, a processor, memory, storage, and I/O devices (e.g., monitor, keyboard, disk drive, Internet connection, etc.). However, computing system 1100 may include circuitry or other specialized hardware for carrying out some or all aspects of the processes. In some operational settings, computing system 1100 may be configured as a system that includes one or more units, each of which is configured to carry out some aspects of the processes either in software, hardware, or some combination thereof.

FIG. 11 depicts computing system 1100 with a number of components that may be used to perform any of the processes described herein. The main system 1102 includes a motherboard 1104 having an I/O section 1106, one or more central processing units (CPU) 1108, and a memory section 1110, which may have a flash memory card 1112 related to it. The I/O section 1106 can be connected to a display 1114, a keyboard and/or other user input (not shown), a disk storage unit 1116, and a media drive unit 1118. The media drive unit 1118 can read/write a computer-readable medium 1120, which can contain programs 1122 and/or data. Computing system 1100 can include a web browser. Moreover, it is noted that computing system 1100 can be configured to include additional systems in order to fulfill various functionalities. Computing system 1100 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Figure 12:
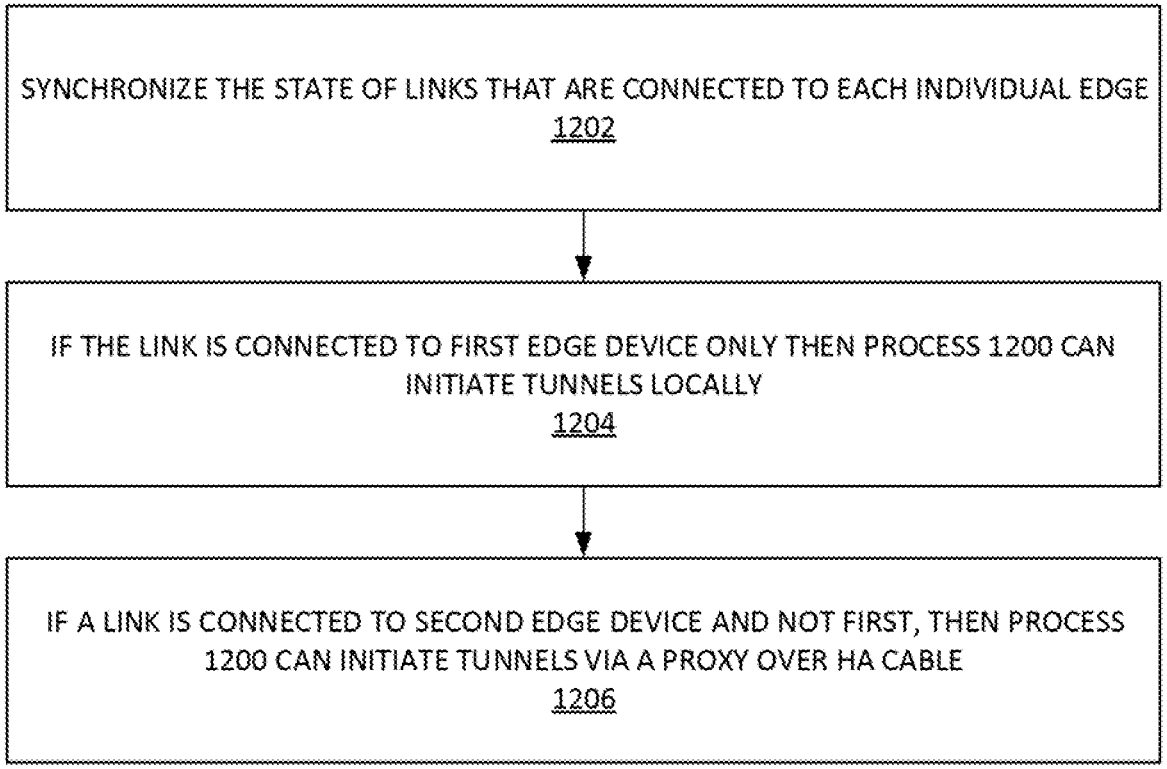
FIG. 12 illustrates an example process for providing dynamic HA mode based on current WAN connectivity, according to some embodiments.

FIG. 12 illustrates an example process 1200 for providing dynamic HA mode based on current WAN connectivity, according to some embodiments. In step 1202, process 1200 can synchronize the state of links that are connected to each individual edge. In step 1204, if the link is connected to first edge device only (and/or both edges in some example embodiments), then process 1200 can initiate tunnels locally. In step 1206, if a link is connected to second edge device and not first, then process 1200 can initiate tunnels via a proxy over HA cable. Dynamic HA Mode election can be used to determine whether there is a WAN Switch providing connectivity to the same link via both edge devices or separate links connected to independent edge devices, and then automatically initiating tunnels locally or via proxy based on auto-detecting this.

Conclusion

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computer-networking method for implementing dynamic high-availability (HA) mode based on current wide area network (WAN) connectivity, comprising the steps of:
   connecting a first edge device of a local area network (LAN) to the WAN through a first set of one or more connection links;
   connecting a second edge device of the LAN to the WAN through a second set of one or more connection links;
   operating the first edge device as an active edge device and the second edge device as a standby edge device;
   using an HA cable link connecting the first and second edge devices to synchronize a state of a plurality of connection links with the WAN that are connected to the first edge device and the second edge device; and
   through the HA cable link and the second edge device, connecting the first edge device to a particular connection link in the second set of connection links of the second edge device for the first edge device to send packets through and receive packets from the particular connection link, wherein when the second edge device connects the first edge device to the particular connection link, the second edge device operates as a switch for connecting the first edge device to the second set of connection links that are connected to the second edge device, wherein the first edge device connects to the second set of connection links only through the second edge device.

2. The computer-networking method of claim 1 further comprising:
   detecting that the second set of connection links are connected to the second edge device and not to the first edge device.

3. The computer-networking method of claim 2 further comprising:
   initiating a tunneling protocol via a proxy device over the HA cable link between the first edge device and the second edge device.

4. The computer-networking method of claim 1 further comprising:
   detecting that the first set of connection links is connected to only the first edge device.

5. The computer-networking method of claim 1 further comprising:
   using a first tunnel to forward packets between a first edge device and the WAN through a connection link of the first set of connection links;
   using a second tunnel to forward packets between a first edge device and the WAN through the particular connection link of the second set of connection links and the second edge device.

6. A computer system for implementing dynamic high-availability (HA) mode based on current wide area network (WAN) connectivity, the computer system comprising:
   a processor; and
   a memory storing instructions which when executed by the processor, causes the processor to perform operations that:
      connect a first edge device of a local area network (LAN) to the WAN through a first set of one or more connection links;
      connect a second edge device of the LAN to the WAN through a second set of one or more connection links;
      operate the first edge device as an active edge device and the second edge device as a standby edge device;
      use an HA cable link connecting the first and second edge devices to synchronize a state of a plurality of connection links with the WAN that are connected to the first edge device and the second edge device; and
      through the HA cable link and the second edge device, connect the first edge device to a particular connection link in the second set of connection links of the second edge device for the first edge device to send packets through and receive packets from the particular connection link, wherein when the second edge device connects the first edge device to the particular connection link, the second edge device operates as a switch for connecting the first edge device to the second set of connection links that are connected to the second edge device, wherein the first edge device connects to the second set of connection links only through the second edge device.

7. The computer system of claim 6 further comprising operations that:
   detect that the second set of connection links are connected to the second edge device and not to the first edge device.

8. The computer system of claim 7 further comprising operations that:
   initiate a tunneling protocol via a proxy device over the HA cable link between the first edge device and the second edge device.

9. The computer system of claim 6 further comprising operations that:
   detect that the first set of connection links is connected to only the first edge device.

10. A non-transitory machine readable medium storing a program which when executing by a processing unit implements a dynamic high-availability (HA) mode based on current wide area network (WAN) connectivity, the program comprising sets of instructions for:
    connecting a first edge device of a local area network (LAN) to the WAN through a first set of one or more connection links;
    connecting a second edge device of the LAN to the WAN through a second set of one or more connection links;
    operating the first edge device as an active edge device and the second edge device as a standby edge device;
    using an HA cable link connecting the first and second edge devices to synchronize a state of a plurality of connection links with the WAN that are connected to the first edge device and the second edge device; and
    through the HA cable link and the second edge device, connecting the first edge device to a particular connection link in the second set of connection links of the second edge device for the first edge device to send packets through and receive packets from the particular connection link, wherein when the second edge device connects the first edge device to the particular connection link, the second edge device operates as a switch for connecting the first edge device to the second set of connection links that are connected to the second edge device, wherein the first edge device connects to the second set of connection links only through the second edge device.

11. The non-transitory machine readable medium of claim 10 further comprising a set of instructions for:

detecting that the second set of connection links are connected to the second edge device and not to the first edge device.

12. The non-transitory machine readable medium of claim 11 further comprising a set of instructions for:
initiating a tunneling protocol via a proxy device over the HA cable link between the first edge device and the second edge device.

13. The non-transitory machine readable medium of claim 10 further comprising a set of instructions for:
detecting that the first set of connection links is connected to only the first edge device.

14. The computer-networking method of claim 1, wherein first set of connection links comprises two or more connection links.

* * * * *